United States Patent [19]

Igarashi et al.

[11] Patent Number: 6,122,646
[45] Date of Patent: *Sep. 19, 2000

[54] METHOD AND APPARATUS FOR MANAGEMENT OF INFORMATION WHERE SUB DIRECTORY INFORMATION IN A DIRECTORY IDENTIFIES THE RELATIVE RECORDING LOCATION OF THE SUB DIRECTORY

[75] Inventors: Tatsuya Igarashi, Kanagawa; Masafumi Minami, Tokyo, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/448,526

[22] PCT Filed: Oct. 18, 1994

[86] PCT No.: PCT/JP94/01750

§ 371 Date: Jul. 31, 1995

§ 102(e) Date: Jul. 31, 1995

[87] PCT Pub. No.: WO95/11508

PCT Pub. Date: Apr. 27, 1995

[30] Foreign Application Priority Data

Oct. 18, 1993 [JP] Japan .................................. 5-259912

[51] Int. Cl.[7] .................................................. G06F 17/30
[52] U.S. Cl. ................................ 707/205; 711/1; 711/2; 711/3; 711/4; 711/200; 711/209; 711/170; 707/200
[58] Field of Search ............................... 395/600, 621; 369/47, 30; 364/200; 369/32; 707/205, 200; 711/1, 2, 3, 4, 200, 209

[56] References Cited

U.S. PATENT DOCUMENTS

| | | |
|---|---|---|
| 4,310,883 | 1/1982 | Clifton et al. ........................ 364/200 |
| 4,791,623 | 12/1988 | Deiotte ................................. 369/59 |
| 4,862,439 | 8/1989 | Ando et al. .......................... 369/30 |

(List continued on next page.)

FOREIGN PATENT DOCUMENTS

| | | |
|---|---|---|
| 0166785 A1 | 1/1986 | European Pat. Off. ........ G11B 20/10 |
| 0314186 | 5/1989 | European Pat. Off. . |
| 0314186 A2 | 5/1989 | European Pat. Off. .......... G06F 3/06 |
| 0328240 A2 | 8/1989 | European Pat. Off. ........ G11B 20/12 |

(List continued on next page.)

OTHER PUBLICATIONS

Patent Abstracts of Japan, vol. 13, No. 471, (P–949), Oct. 25, 1989, JP–A–01 184763, (Hitachi Ltd.) Jul. 24, 1989, Inv: Haruo Takeda et al.

Patent Abstracts of Japan, vol. 8, No. 278, (P–322), Dec. 19, 1984, JP–A–59 144012, (Matushita Denki Sangyo KK) Aug. 17, 1984, Inv: Teruhisa Kaneko et al.

Patent Astracts of Japan, vol. 14, No. 345, (P–1083) Jul. 26, 1990, JP–A–02 122488, (Toshiba Corp.) May 10, 1990, Inv: Takuji Yoshida.

Patent Abstracts of Japan, vol. 15, No. 503 (P–1290), JP 3–217972, Published Sep. 25, 1991, Hitachi Ltd.

Patent Abstracts of Japan, vol. 18, No. 630 (P–1835), JP 6–242892, Published Sep. 20, 1994, Mitsubishi Kasei Corp.

*Primary Examiner*—Paul R. Lintz
*Assistant Examiner*—Jean M. Corrielus
*Attorney, Agent, or Firm*—Limbach & Limbach L.L.P.

[57] ABSTRACT

In this invention, data track of a magneto-optical disc is divided into a volume management area and an extent area to record data of file into the extent area, and to record directory management information and file management information into the volume management area. The volume management area is caused to consist of 32 clusters. Data allocation unit of the volume management area is caused to be 2 k bytes and data allocation unit in the extent area is caused to be 8 k bytes. Relative recording location within the volume management area of sub directory is recorded, as directory information, into the volume management area. Thus, this invention can quickly carry out access.

30 Claims, 20 Drawing Sheets

U.S. PATENT DOCUMENTS

| | | | |
|---|---|---|---|
| 4,945,475 | 7/1990 | Bruffey et al. | 364/200 |
| 5,058,002 | 10/1991 | Nakamura et al. | 364/200 |
| 5,111,442 | 5/1992 | Nakajima et al. | 369/47 |
| 5,280,468 | 1/1994 | Nakajima et al. | 369/275 |
| 5,392,265 | 2/1995 | Takezawa | 369/32 |
| 5,434,991 | 7/1995 | Maeda et al. | 395/425 |
| 5,442,614 | 8/1995 | Tamegai | 369/58 |
| 5,475,668 | 12/1995 | Azumatani et al. | 369/58 |
| 5,481,702 | 1/1996 | Takahashi | 395/600 |
| 5,526,335 | 6/1996 | Tamegai | 369/58 |
| 5,555,405 | 9/1996 | Griesmer et al. | 395/600 |
| 5,566,153 | 10/1996 | Hosaka | 369/58 |
| 5,566,379 | 10/1996 | Mawatari et al. | 360/48 |

FOREIGN PATENT DOCUMENTS

| | | | |
|---|---|---|---|
| 0382528 | 8/1990 | European Pat. Off. . | |
| 0382528 A1 | 8/1990 | European Pat. Off. | G11B 7/013 |
| 0448378 A2 | 9/1991 | European Pat. Off. | G11B 7/007 |
| 0482851 A2 | 4/1992 | European Pat. Off. | G06F 3/06 |
| 0508762 | 10/1992 | European Pat. Off. . | |
| 0508762 A2 | 10/1992 | European Pat. Off. | G11B 7/00 |
| 0626646 | 11/1994 | European Pat. Off. . | |
| 0626646 A1 | 11/1994 | European Pat. Off. | G06F 12/02 |
| 59-144012 | 8/1984 | Japan . | |
| 1184763 | 7/1989 | Japan . | |

Management Table (4KB)

| # | | | |
|---|---|---|---|
| 0 | Reserved | | |
| 1 | Reserved | | |
| 2 | Reserved | | |
| 3 | Reserved | | |
| 4 | 0 | 00000002 | |
| 5 | 80 | | 04 |
| 6 | 0 | 00000003 | |
| 7 | F0 | 00 | 0008 |
| 8 | FE | | 000A |
| 9 | 00000000 | | |
| 10 | FF | 000005 | |
| 11 | 80 | | 0A |
| 12 | 0 | 00000009 | |
| ... | | | |
| 1023 | 00000000 | | |

4bytes

FIG. 7

DIRECTORY RECORD

| |
|---|
| (FOR DIRECTORY) |
| Name |
| Index to DRB |
| ID |
| Size |
| Date |
| (FOR FILE) |
| Extent record of File Data |
| Index to ER (Index to ERB, Offset of ER) |
| (Extent Start Location) |
| Number of Blocks |
| ID |
| Size |
| Date |

FIG.8

Directory Records Block Entry (consists of only one DRB) :

| 0 | ID |
|---|---| bit31

FIG.9

Directory Records Block Entry (consists of more than one DRB) : first

| F0 | ID(MSB)(1byte) | Index to next DRB |
|---|---|---|

FIG.10

Directory Records Block Entry (consists of only one DRB) : Second or more than

| FE | Reserved | Index to next DRB |
|---|---|---|

FIG.11

Directory Records Block Entry (consists of only one DRB) : Last

| FF | ID(3bytes less than MSB) |
|---|---|

FIG.12

Extent Records Block Entry :

| 80 | Reserved | Used Count |
|---|---|---|

FIG.13

Extents Records Index :

| Logical Offset | Index to ERB | Offset of ER |
|---|---|---|
| 2 bytes | 10 bits (0-1023) | 6 bits (0-63) |

FIG.15

Extents Descriptor :

| Extent Start Location | Number of Blocks |
|---|---|
| 2 bytes | 2 bytes |

FIG.16

METHOD AND APPARATUS FOR MANAGEMENT OF INFORMATION WHERE SUB DIRECTORY INFORMATION IN A DIRECTORY IDENTIFIES THE RELATIVE RECORDING LOCATION OF THE SUB DIRECTORY

RELATED APPLICATION

This application is a continuation under rule 371 of Ptc/JP94/01750 filed on Oct. 10, 1994

TECHNICAL FIELD

This invention relates to a method for management of information (hereinafter simply referred to an information management method depending upon circumstances), a data recording medium, a data recording method, an information retrieving method, and an information retrieving apparatus, which are suitable when used in the case of carrying out management of information recorded with respect to an information recording medium where access speed is relative low, e.g., a magneto-optical disc or an optical disc, etc.

BACKGROUND ART

In MS-DOS (trade name) popuralized as an operating system for personal computer in recent years, both directory management information and file data are recorded together in the same recording units in the same area. This method advantageously constructs a hierarchical directory file system without making distinction between a method for management of file and a method for management of directory.

In the method of UNIX (trade name), the recording area is divided into Data Block and Super Block. Directory file, sub-directory file and data file are recorded in the Data Block, and i-node list is recorded in the Super Block.

In the directory file, name of file belonging to a corresponding directory and i-node No. are described. The i-node list consists of a plurality of i-nodes to which predetermined numbers are attached, and respective i-nodes describe recording positions (locations) within Data Block of the sub-directory file and the data file.

Further, in the method of Macintosh (trade name) disclosed, e.g., in the U.S. Pat. No. 4,945,475 and the Japanese Patent Application Laid Open No. 16132/1988, etc., directory management information are caused to all undergo hierarchical management by making use of the structure of B-Tree in Catalog File. Namely, collective management of all of files and directories is carried out by keys of records of B-Tree (combination of ID (Identification) Nos. of parent directories and file names. This catalog file is recorded in practice in a concentrated area. For retrieval of data file, such B-Tree is used in place of directly employing hierarchical information of directory so that any file in the hierarchical directory is indirectly retrieved.

However, in the hierarchical directory file system of MS-DOS, since information of respective directories are recorded in a distributed (dispersed) manner onto a recording medium, there is the possibility that files existing at lower rank layers of the hierarchical directory must undergo seeking (search) over the entirety of the recording medium for retrieval of directory. As a result, in the case of recording media where access speed is low, remarkably lowering of file access speed would result.

In the case where directory management information are recorded in a distributed manner as described above, the number of physical write/read operations for updating of directory is increased, and buffer utilization efficiency of the directory management information also becomes poor.

Moreover, in the case of the method of UNIX, while the number of physical write operations of Super Block can be reduced by carrying out buffering, since management of i-node itself is carried out by a method independent of the directory hierarchy (i-node list), a method for management of these i-nodes becomes complicated. Accordingly, this management method is not effective for compact (small-sized) equipments such as personal computer, etc. aside from higher performance work station.

Further, since the management by B-Tree is extremely complicated and an access to sub-directory is indirectly provided in place of directly making an access to sub-directory by using directory hierarchical information, it is necessary to retrieve node trees of B-Tree every retrieval operations of directory.

Since B-Tree is of a structure such that distances from the root of the tree up to all leaves are the same (the same number of stages), retrieval is efficiently carried out. However, according as the numbers of directories and/or files is increased, such distances (the number of stages) are increased in a manner of three stages, or four stages. As a result, the number of access operations has a tendency to substantially increase as compared to the case where location (position) of directory is directly indicated. For this reason, this method is not efficient and is not suitable for compact (small-sized) equipments.

This invention has been made in view of such circumstances, and contemplates permitting retrieval of a predetermined directory file in the hierarchical directory by a simple method, and providing realization of high speed file retrieval and reduction of the number of physical read/write operations for updating of directory. In addition, this invention contemplates permitting directory information to be updated in a short time.

DISCLOSURE OF THE INVENTION

A method for management of information described in claim 1 is directed to an information management method for carrying out management of information recorded on a recording medium, characterized in that management of a first area (e.g., Extent Area of FIG. 4) on the recording medium (e.g., magneto-optical disc 804 of FIG. 2) where data of file are recorded is carried out in first allocation units (e.g., Allocation Blocks) by using first management information (e.g., Volume Space Bitmap (VSB) of FIG. 6), that management of a second area (e.g., Volume Management Area of FIG. 4) on the recording area, which is distinguished (separated) from the first area, is carried out in second allocation units (e.g., Management Blocks) each independent of the first allocation unit by using second management information (e.g., Management Table (MT) of FIG. 7), and that sub-directory information (e.g., Directory Record for directory of FIG. 8) in a directory (e.g., Directory Record Block (DRB) of FIG. 5) constituted with at least one of the second allocation units within the second area includes information (e.g., Index to DRB of FIG. 8) indicating location (position) in the second area of the second allocation unit constituting that directory.

The second allocation unit may be caused to be smaller than the first allocation unit.

In the case where one file consists of the plural first allocation units existing at discrete or separate locations (positions), data recorded in the second area may be caused to include file extent information (e.g., Extent Record (ER) of FIG. 14 including Extent Record Index of FIG. 15 or Extent Descriptor of FIG. 16) indicating a corresponding one or ones constituting the one file, of the first allocation units of the first area.

File information (e.g., Directory Record for file of FIG. 8) corresponding to one file in the directory may be caused to include information (e.g., Index to ER of FIG. 8) indicating location of the second allocation unit including file extent information in the second area.

In the case where one file consists of successive first allocation units, file information (e.g., Directory Record for file of FIG. 8) corresponding to one file in the directory may be caused to include file location (position) information (e.g., Extent Start Location of FIG. 8) indicating a constituting the one file, of the first allocation units of the first area.

In the case where one directory consists of a plural second allocation units, the second management information may be caused to include link information (e.g., Index to next DRB of FIG. 10) indicating information in which the plural second allocation units are connected to each other.

Data recorded in the second area may be caused to include information (e.g., Volume Descriptor (VD) of FIG. 5) indicating location of root directory in the second area.

A data recording medium described in claim 8 is directed to a data recording medium (e.g., magneto-optical disc 804 of FIG. 2) on which data having hierarchical structure are recorded, characterized in that data of file are recorded in first allocation units (e.g., Allocation Block) in a first area (e.g., Extent Area of FIG. 4), that a plurality of directories are recorded in second allocation units (e.g., Management Block) each independent of the first allocation unit in a second area (e.g., Volume Management Area of FIG. 4) distinguished (separated) from the first area, and that sub directory information (e.g., Directory Record for directory of FIG. 8) in each directory includes information (e.g., Index to DRB of FIG. 8) indicating location in the second area of the second allocation unit constituting that sub directory.

The second allocation unit may be caused to be smaller than the first allocation unit.

In the case where one file consists of plural first allocation units existing at discrete or separate locations, data recorded in the second area may be caused to include file extent information (e.g., Extent Record (ER) of FIG. 14) indicating a corresponding one or ones constituting the one file, of the first allocation units of the first area.

File information (e.g., Directory Record for file of FIG. 8) corresponding to one file in the directory may be caused to include information (e.g., Index to ER of FIG. 8) indicating location of the second allocation unit including file extent information in the second area.

In the case where one file consists of successive first allocation units, file information (e.g., Directory Record for file of FIG. 8) corresponding to one file in the directory may be caused to include file location information (e.g., Extent Start Location of FIG. 8) indicating a corresponding one or ones constituting the one file, of the first allocation units of the first area.

In the case where one directory consists of plural second allocation units, management information within data recorded in the second area may be caused to include link information (e.g., Index to next DRB of FIG. 10) indicating information in which the plurality second allocation units are connected to each other.

Data recorded in the second area may be caused to include information (e.g., Volume Descriptor (VD) of FIG. 5) indicating location of root directory in the second area.

A data recording method described in claim 15 is directed to a data recording method for recording data having hierarchical directory structure onto a recording medium (e.g., magneto-optical disc 804 of FIG. 2), characterized in that data of file are recorded in first allocation units (e.g., Allocation Block) in a first area (e.g., Extent Area of FIG. 4), that a plurality of directories are recorded in second allocation units (e.g., Management Block) each independent of the first allocation unit in a second area (e.g., Volume Management Area of FIG. 4) distinguished (separated) from the first area, and that sub directory information (e.g., Directory Record for directory of FIG. 8) in each directory includes information (e.g., Index to DRB of FIG. 8) indicating location in the second area of the second allocation unit constituting that sub directory.

The second allocation unit may be caused to be smaller than the first allocation unit.

In the case where one file consists of plural first allocation units existing at discrete or separate locations, data recorded in the second area may be caused to include file extent information (e.g., Extent Record (ER) of FIG. 14) indicating a corresponding one or ones constituting the one file, of the first allocation units of the first area.

File information (e.g., Directory Record for file of FIG. 8) corresponding to one file in the directory may be caused to include information (e.g., Index to ER of FIG. 8) indicating location of the second allocation unit including file extent information in the second area.

In the case where one file consists of successive first allocation units, file information (e.g., Directory Record for file of FIG. 8) corresponding to one file in the directory may be caused to include file location information (e.g., Extent Start Location of FIG. 8) indicating a corresponding one or ones constituting the one file, of the first allocation units of the first area.

In the case where one directory consists of plural second allocation units, management information within data recorded in the second area may be caused to include link information (e.g., Index to next DRB of FIG. 10) indicating information in which plural second allocation units are connected to each other.

The data recorded in the second area may be caused to include information (e.g., Volume Descriptor (VD) of FIG. 5) indicating location of root directory in the second area.

An information retrieving method described in claim 22 is directed to an information retrieving method for retrieving a desired file from a recording medium in which management of a first area (e.g., extent area of FIG. 4) on a recording medium (e.g., magneto-optical disc 804 of FIG. 2) where data of file are recorded is carried out in first allocation units (e.g., Allocation Block) by using first management information (e.g., Volume Space Bitmap (VSB)), management of a second area (e.g., Volume Management Area of FIG. 4) on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) is caused to include information (e.g., Index to DRB of FIG. 8) indicating location in the second area of the second allocation unit constituting that sub directory, characterized in that the method comprises the steps of: providing an access to root directory on the basis of predetermined location information (e.g., Volume Descriptor of FIG. 5) within data recorded in the second area; and providing an access to the desired file on the recording medium on the basis of file location information (e.g., Extent Start Location of FIG. 8) indicating a corresponding one or ones of the first allocation units of the first area, constituting the desired file in file information (e.g., Directory Record for file of FIG. 8) corresponding to the desired file in the root directory.

An information retrieving method described in claim 23 is directed to an information retrieving method for retrieving a desired file from a recording medium in which management of a first area (e.g., Extent Area of FIG. 4) on the recording medium (e.g., magneto-optical disc 804 of FIG. 2) where data of file are recorded is carried out in first allocation units (e.g., Allocation Block) by using first management information (e.g., Volume Space Bitmap (VSB) of FIG. 6), management of a second area (e.g., Volume Management area of FIG. 4), on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) in a directory consisting of at least one of the second allocation units within the second area is caused to include information (Index to DRB of FIG. 8) indicating location in the second area of the second allocation unit constituting that sub directory, characterized in that the method comprises the steps of: providing an access to root directory on the basis of first location information (e.g., Volume Descriptor of FIG. 5) within data recorded in the second area; providing an access to sub directory including file information corresponding to the desired file on the basis of second location information (e.g., Index to DRB of FIG. 8) in the root directory and parent directory; and providing an access to the desired file on the recording medium on the basis of file location information (e.g., Extent Start Location of FIG. 8) indicating a corresponding one or ones of the first allocation units of the first, area constituting the desired file of file information (e.g., Directory Record for file of FIG. 8) corresponding to the desired file in the sub directory.

An information retrieving method described in claim 24 is directed to an information retrieving method for retrieving a desired file from a recording medium in which management of a first area (e.g., Extent Area of FIG. 4) on the recording medium (e.g., magneto-optical disc 804 of FIG. 2) where data of file are recorded is carried out in first allocation units (e.g., Allocation Block) by using first management information (e.g., Volume Space Bitmap (VSP) of FIG. 6), management of a second area (e.g., Volume Management Area of FIG. 4), on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) in a directory consisting of at least one of the second allocation units within the second area is caused to include information (Index to DRB of FIG. 8) indicating location in the second area of the second allocation unit constituting that sub directory, characterized in that the method comprises the steps of: providing an access to root directory on the basis of first location information (e.g., Volume Descriptor of FIG. 5) within data recorded in the second area; providing an access to sub directory including file information corresponding to the desired file on the basis of second location information (e.g., Index to DRB of FIG. 8) in the root directory and parent directory; providing an access to file extent information (e.g., Extent Record (ER) of FIG. 14) indicating a corresponding one or ones of the first allocation units of the first area constituting the desired file on the basis of third location information (e.g., Index to ER of FIG. 8) of file information (e.g., Directory Record for file of FIG. 8) corresponding to the desired file in the sub directory; and providing an access to the desired file on the recording medium on the basis of the file extent information.

An approach may be employed to read out, from the recording medium, data recorded in the second area to store, into a memory (e.g., RAM 18 of FIG. 1), the data recorded in the second memory which has been read out to carry out an access to root directory, an access to sub directory, and/or an access to file extent information by using the data stored in the memory.

An information retrieving apparatus described in claim 26 is directed to an information retrieving apparatus adapted for retrieving a desired file from a recording medium in which management of a first area (e.g., Extent Area of FIG. 4) on the recording medium (e.g., magneto-optical disc 804 of FIG. 2) where data of file are recorded is carried out in first allocation units (e.g., Allocation Block) by using first management information (e.g., Volume Space Bitmap (VSB) of FIG. 6), management of a second area (e.g., Volume Management area of FIG. 4) on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) in a directory consisting of at least one of the second allocation units within the second area is caused to include information (Index to DRB of FIG. 8) indicating location in the second area of the second allocation unit constituting that sub directory, characterized in that the apparatus comprises: means (e.g., step S2 of the flowchart of FIG. 18) for providing an access to root directory on the basis of predetermined location information (e.g., Volume Descriptor of FIG. 5) within data recorded in the second area; and means (e.g., step S13 of the flowchart of FIG. 20) for providing an access to a desired file on the recording medium on the basis of file location information (e.g., Extent Start Location of FIG. 8) indicating a corresponding one or ones of the first allocation units of the first area, constituting the desired file of file information (e.g., Directory Record for file of FIG. 8) corresponding to the desired file in the root directory.

An information retrieving apparatus described in claim 27 is directed to an information retrieving apparatus adapted for retrieving a desired file from a recording medium in which management of a first area (e.g., Extent Area of FIG. 4) on the recording medium (e.g., magneto-optical disc 804 of FIG. 2) where data of file are recorded is carried out in first allocation units (e.g., Allocation Block) by using first management information (e.g., Volume Space Bitmap (VSB)), management of a second area (e.g., Volume Management Area of FIG. 4) on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) in a directory consisting of at least one of the second allocation units within the second area is caused to include information (e.g., Index to DRB of FIG. 8) indicating location in the second area of the second allocation unit constituting that sub directory, characterized in that the apparatus comprises: means (e.g., step S2 of the flowchart of FIG. 18) for providing an access to root directory on the basis of first location information (e.g., Volume Descriptor of FIG. 5) within data recorded in the second area; means (e.g., step S3 of the flowchart of FIG. 18) for providing an access to sub directory including file information corresponding to the desired file on the basis of second location information (e.g., Index to DRB of FIG. 8) in the root directory and parent directory; and means (e.g., step S13 of the flowchart of FIG. 20) for providing an access to the desired file on the recording medium on the basis of file location information (e.g., Extent Start Location of FIG. 8) indicating a corresponding one or ones of the first allocation units of the first area, constituting the desired file in file information (e.g., Directory record for file of FIG. 8) corresponding to the desired file in the sub directory.

An information retrieving apparatus described in claim 28 is directed to an information retrieving apparatus adapted for retrieving a desired file from a recording medium in which management of a first area (e.g., Extent Area of FIG. 4) on the recording medium (e.g., magneto-optical disc 804 of FIG. 2) where data of file are recorded is carried out in first allocation units (e.g., Allocation Block) by using first management information (e.g., Volume Space Bitmap (VSB) of FIG. 6), management of a second area (e.g., Volume Management Area of FIG. 4), on the recording medium distinguished (separated) from the first area is carried out in second allocation units (e.g., Management Block) each independent of the first allocation unit by using second management information (e.g., Management Table (MT) of FIG. 7), and sub directory information (e.g., Directory Record for directory of FIG. 8) in a directory consisting of at least one of the second allocation units within the second area is caused to include information (e.g., Index to DRB of FIG. 8) indicating location in the second area of the second allocation unit constituting that sub directory, characterized in that the apparatus comprises: means (e.g., step S2 of the flowchart of FIG. 18) for providing an access to root directory on the basis of first location information (e.g., Volume Descriptor of FIG. 5) within data recorded in the second area; means (e.g., step S3 of the flowchart of FIG. 18) for providing an access to sub directory including file information corresponding to the desired file on the basis of second location information (e.g., Index to DRB of FIG. 8) in the root directory and parent directory; means (e.g., step S10 of the flowchart of FIG. 19) for providing an access to file extent information (e.g., Extent Record (ER) of FIG. 14) indicating a corresponding one or ones of the first allocation units of the first area, constituting the desired file on the basis of third location information (e.g., Index to ER of FIG. 8) in file information corresponding to the desired file in the sub directory; and means (e.g., step S15 of the flowchart of FIG. 20) for providing an access to the desired file on the recording medium on the basis of the file extent information.

Means (e.g., optical pick-up 806 of FIG. 2) for reading out, from the recording medium, data recorded in the second area and a memory (e.g., RAM 18 of FIG. 1) for storing the data recorded in the second area which has been read out may be further provided to carry out an access to root directory, an access to sub directory and/or an access to file extent information by using data stored in the memory.

A method for management of information is directed to an information management method for an information recording medium (e.g., disc of the hybrid type of FIG. 23) including a recordable area (e.g., recordable area of FIG. 23) where information can be recorded and a rewrite disable area (e.g., premastered area of FIG. 23) where information once recorded cannot be rewritten), wherein directory management information is recorded in the rewrite disable area, characterized in that when the write recordable area is initialized, directory management information (e.g., Volume Management Area (VMA) of FIG. 23) recorded in the rewrite disable area is copied to the recordable area to carry out, at times subsequent thereto, management of information on the basis of directory management information of the recordable area.

The information recording medium may be caused to be a hybrid disc including an optically reproducible reproduction only area (e.g., pre-mastered area of FIG. 23) where information are recorded in advance as pre-pits, and a recording area (e.g., recordable area of FIG. 23) where information can be magneto-optically written, wherein the directory management information is recorded in the reproduction only area.

A method for management of information is directed to an information management method for a write once type information recording disc (e.g., disc of the write once type of FIG. 25) where information can be recorded by only one, characterized in that the method comprises the steps of: recording, into a first area (e.g., session 2 of FIG. 25), predetermined data (e.g., file 3 of FIG. 25) and directory management information (e.g., Volume Management Area (VMA) of FIG. 25) for carrying out data; recording, into a second area, new directory management information including the directory management information recorded in the first area when new data (e.g., files 4, 5 of FIG. 25) into the second area (e.g., session 3 of FIG. 25; and carrying out, at times subsequent thereto, management of data on the basis of the directory management information of the second area.

Thus, in the information management method described in the claim 1 and the data recording method described in the claim 15, sub directory information is recorded into the volume management area in a manner to include Index to DRB indicating location in the volume management area. Accordingly, the number of physical read/write operations for updating of directory is reduced, thus making it possible to retrieve, with ease and at a high speed, a predetermined directory file in the hierarchical directory. In addition, it becomes possible to update directory information in a short time.

In the data recording medium described in the claim 8, sub director information is recorded in the volume management area. Further, the sub directory information includes Index to DRB indicating location in the volume management area. Accordingly, it becomes possible to realize a data recording medium which can be retrieved with ease and at a high speed.

In the information retrieving method described in the claim 22 and the information retrieving apparatus described in the claim 26, root directory is accessed from volume descriptor, and file is accessed on the basis of Extent Start Location in the root directory.

In the information retrieving method described in the claim 23 and the information retrieving apparatus described in the claim 27, root directory is accessed from volume descriptor and sub directory is accessed on the basis of Index to DRB in the root directory and parent directory. Further, file is accessed on the basis of Extent Start Location in the sub directory.

In the information retrieving method described in the claim 24 and the information retrieving apparatus described in the claim 28, root directory is accessed from volume descriptor and sub directory is accessed on the basis of Index to DRB in the root directory and parent directory. Further, extent record is accessed on the basis of Index to ER in the sub directory. Furthermore, file is accessed on the basis of the extent record.

Accordingly, in either case, simple and quick access can be made.

In the information management method, when the recordable area is initialized, volume management area recorded in the rewrite disable area is copied to the recordable area. At times subsequent thereto, management of information is carried out on the basis of the volume management area of the recordable area. Accordingly, it becomes possible to unitarily carry out management of information of the recordable area and the rewrite disable area.

In the information management method, when data is recorded into a new session, a new volume management area including volume management area which has been recorded in the old session is recorded. At times subsequent thereto, management of information is carried out on the basis of the new volume management area. Accordingly, it becomes possible to unitarily carry out management of old information and information which has been written once.

BRIEF DESCRIPTION OF THE DRAWINGS

FIG. 7 is a view showing the configuration of the management table of FIG. 5.

FIG. 8 is a view for explaining directory record constituting directory record block of FIG. 5.

FIG. 9 is a view for explaining the format of directory record block entry of the management table of FIG. 7.

FIG. 10 is a view for explaining the format of the directory record block entry of the management table of FIG. 7.

FIG. 11 is a view for explaining the format of the directory record block entry of the management table of FIG. 7.

FIG. 12 is a view for explaining the format of the directory record block entry of the management table of FIG. 7.

FIG. 13 is a view for explaining the format of extent record block entry of the management table of FIG. 7.

FIG. 15 is a view for explaining the format of extent record index of FIG. 14.

FIG. 16 is a view for explaining the format of extent descriptor of FIG. 14.

BEST MODE FOR CARRYING OUT THE INVENTION

Figure 1:
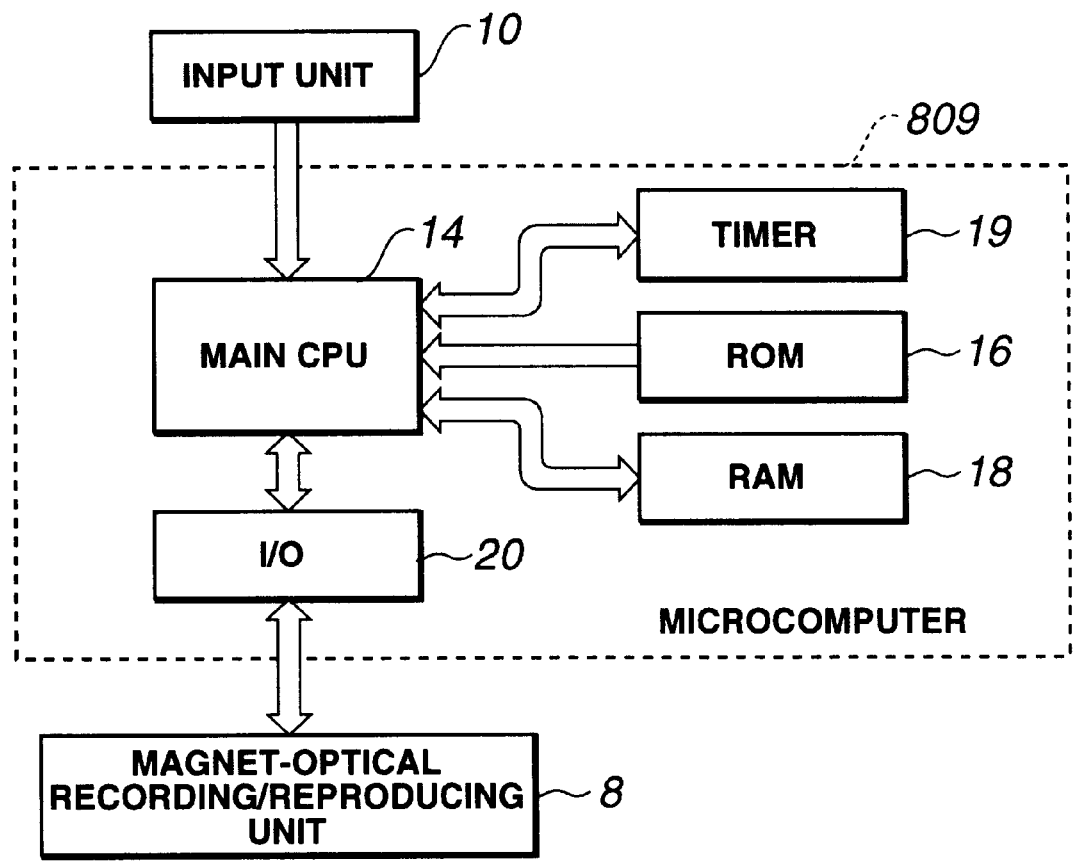
FIG. 1 is a block diagram showing the configuration of an embodiment of an information processing apparatus to which an information management method of this invention is applied.

The configuration of an embodiment of an information processing apparatus to which a method for management of information of this invention is applied is shown in FIG. 1.

An input unit 10 delivers data and command corresponding to key operation of an operator to a microcomputer 12.

The microcomputer 12 comprises a main CPU 14, a ROM 16 in which programs that the main CPU 14 uses are stored in advance, a RAM 18 used as a work area, a timer 19 for generating time information, and an input/output (I/O) interface 20 for carrying out transmission and reception of various data between the main CPU 14 and external peripheral equipments.

A magneto-optical recording/reproducing unit 8 is operative so that when operation mode is recording mode, it records, onto a disc loaded thereto, data delivered through the input/output interface 20 from the main CPU 14, while when the operation mode is reproducing mode, it reproduces data from the disc, thus to output it to the main CPU 14 through the input/output interface 20.

Figure 2:
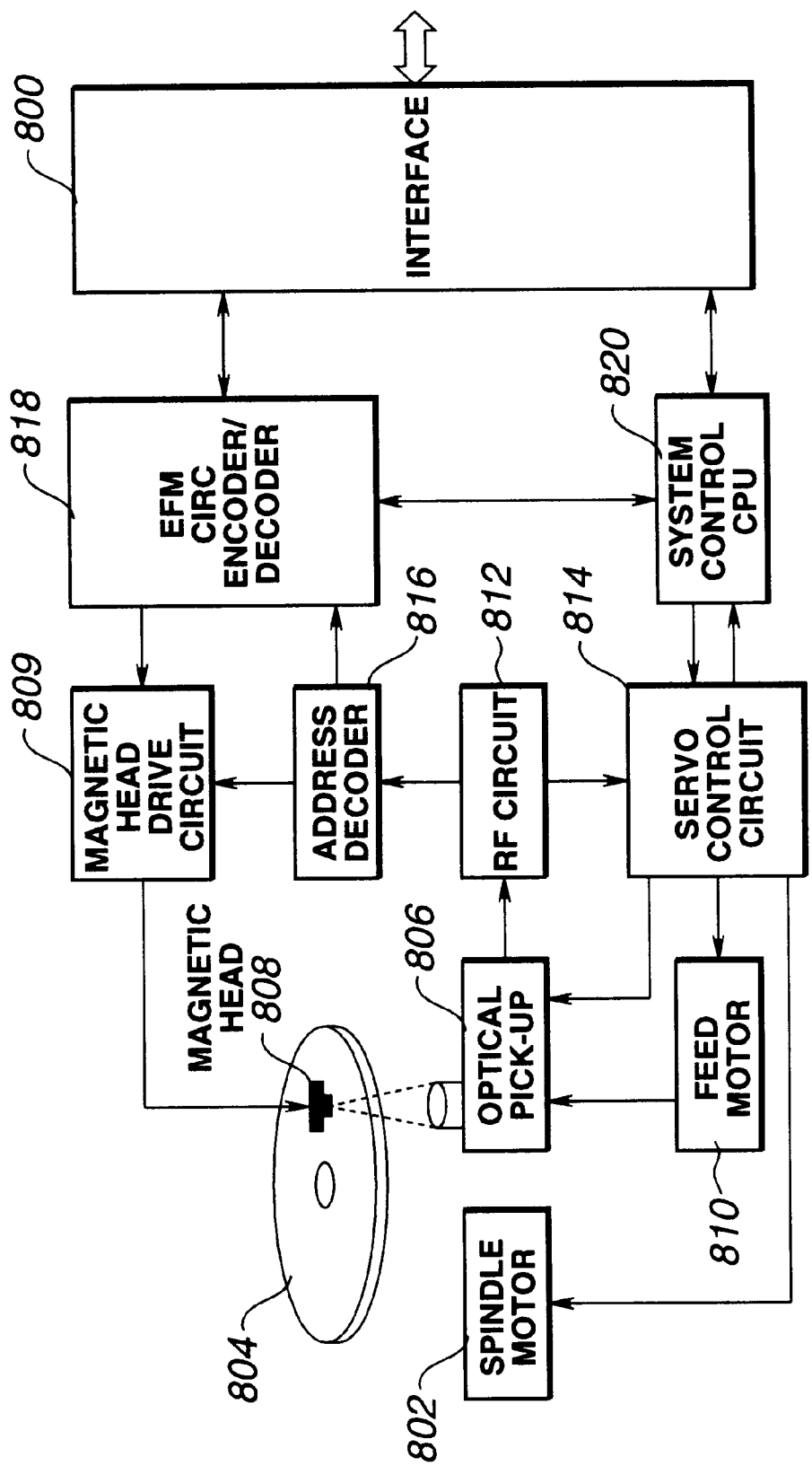
FIG. 2 is a block diagram showing an example of the configuration of a magneto-optical recording/reproducing apparatus in the embodiment of FIG. 1.

An example of the configuration of the magneto-optical recording/reproducing unit 8 of FIG. 1 is shown in FIG. 2. The magneto-optical recording/reproducing unit (MDXD) 8 illustrated here serves to record or reproduce information with respect to a recording medium in which either one of read-out (reproduction) only type optical disc of diameter of 64 mm, read/write type, i.e., rewritable magneto-optical (MO) disc, and hybrid (partial ROM) disc having read/write (i.e., rewrite) area and read-out only area is accommodated within the cartridge.

The magneto-optical recording/reproducing unit 8 records data by the magnetic field modulation overwrite recording system with respect to the MO disc or the hybrid disc. Moreover, the magneto-optical recording/reproducing unit 8 is adapted so that in the case where a recording medium is the read-out only type optical disc, it detects a reproduction signal by making use of diffraction phenomenon of light in pit train of the target track, and in the case where a recording medium is read/write type MO disc, it detects difference of polarization angle (Kerr rotational angle) of a reflected light from the target track to detect a reproduction signal. In addition, in the case where a recording medium is hybrid disc, the magneto-optical recording/reproducing unit 8 detects a reproduction signal by making use of diffraction phenomenon of light in pit train of the target track in the read-out only area, and detects difference of polarization angle (Kerr rotational angle) of a reflected light from the target track in the read/write area.

For such magneto-optical recording/reproducing unit 8, a portion of the MD (Mini Disc (Trade Name)) which has been developed in uses of personal audio equipments (of the portable type, the stationary type, or the vehicle mount type) may be diverted thereto. With respect to the MD system, in the process of development as personal audio equipment, integration of respective circuit elements and/or optimization of respective mechanism elements have been realized. Thus, it has been attained that the entirety of the unit becomes compact (small-sized) and becomes light in weight, and battery operation can be made by realization of low power consumption. Further, the MD system has the features that it has substantially the same memory capacity (140 M bytes) as that of the existing 3.5 inch MO disc drive, and exchange of recording media can be made. In addition to the above, the manufacturing cost of the entirety of the unit or recording media can be reduced as compared to other MO disc drives by the mass-production effect. Further, reliability has been sufficiently also proven from a viewpoint of actual results of use as personal audio equipments.

In FIG. 2, modulation magnetic field corresponding to recording data is applied by means of a magnetic head 808 onto a magneto-optical disc 804 rotationally driven by a spindle motor 802 under the state where laser beams are irradiated thereto by means of an optical pick-up 806 to thereby carry out magnetic field modulation overwrite recording along recording tracks of the magneto-optical disc 804 to trace recording tracks of the magneto-optical disc 804 by laser beams by means of the optical pick-up 806 to thereby magneto-optically carry out reproduction of data.

The optical pick-up 806 is composed of optical parts, e.g. laser light source such as laser diode, etc., collimator lens, objective (object lens), polarization beam splitter or cylindrical lens, etc., and photo detector divided so as to take a predetermined shape, etc., and is caused to be positioned by a feed motor 810 at the position opposite to a magnetic head 808 under the state the magneto-optical disc 804 is put between the optical pick-up 806 and the magnetic head 808.

At the time of recording data onto the magneto-optical disc 804, the magnetic head 808 is driven by a magnetic head drive circuit 809, so modulation magnetic field corresponding to recording data is applied to the magneto-optical disc 804. The optical pick-up 806 irradiates laser beams onto the target track of the magneto-optical disc 804 to thereby carry out data recording by thermal magnetic recording.

Moreover, the optical pick-up 806 detects laser beams irradiated onto the target track to thereby detect focus error by, e.g., astigmatism method, and to detect tracking error by, e.g., push-pull method. At the time of reproducing data from the magneto-optical disc 804, the optical pick-up 806 detects difference of polarization angle (Kerr rotational angle) of a reflected light from the target track to generate a reproduction signal.

An output of the optical pick-up 806 is delivered to a RF circuit 812. The RF circuit 812 extracts, from the output of the optical pick-up 806, a focus error signal or a tracking error signal to deliver it to a servo control circuit 814, and to binarize the reproduction signal (allows the reproduction signal to be a binary signal) to deliver it to an address decoder 816. The address decoder 816 decodes address from the delivered binary reproduction signal to output it to an EFM·CIRC encoder/decoder 818, and to deliver binary reproduction data except for binary reproduction data related to address also to the EFM·CIRC encoder/decoder 818.

The servo control circuit 814 is comprised of, e.g., focus servo control circuit, tracking servo control circuit, spindle motor servo control circuit, and sled servo control circuit, etc.

The focus servo control circuit carries out focus control of the optical system of the optical pick-up 806 so that the focus error signal becomes equal to zero. The tracking servo control circuit carries out control of the feed motor 810 (or actuator for tracking) of the optical pick-up 806.

Further, the spindle motor servo control circuit controls the spindle motor 802 so as to rotationally drive the magneto-optical disc 8 at a predetermined rotational velocity (e.g., constant linear velocity). In addition, the sled servo control circuit moves, by the feed motor 810, the magnetic head 808 and the optical pick-up 806 to the target track position of the magneto-optical disc 804 designated by a system control CPU 820.

The EFM·CIRC encoder/decoder 818 carries out encoding processing for error correction, i.e., encoding processing of CIRC (Cross Interleave Reed-Solomon Code) with respect to data delivered through the interface 800, and carries out modulation processing suitable for recording, i.e., EFM (Eight to Fourteen Modulation) encoding processing with respect thereto.

Encoded data outputted from the EFM·CIRC encoder/decoder 818 is delivered, as recording data, to the magnetic head drive circuit 809. The magnetic head drive circuit 809 drives the magnetic head 808 so as to apply modulation magnetic field corresponding to recording data onto the magneto-optical disc 804.

The system control CPU 820 carries out control of recording position on the magneto-optical disc 804 so that recording data is recorded onto recording tracks of the magneto-optical disc 804 when the CPU 820 is caused to undergo write instruction through the interface 800. The control of recording position is carried out by carrying out management of recording position on the magneto-optical disc 804 of encoded data outputted from the EFM·CIRC encoder/decoder 818 by the system control CPU 820 to deliver, to the servo control circuit 814, a control signal to designate recording position of recording tracks of the magneto-optical disc 804.

At the time of reproduction, the EFM·CIRC encoder/decoder 818 carries out EFM demodulation processing with respect to inputted binary reproduction data, and carries out CIRC decoding processing for error correction with respect thereto to output the data thus processed through the interface 800.

Moreover, the system control CPU 820 carries out control of reproduction position with respect to recording tracks of the magneto-optical disc 804 so that reproduction data can be continuously obtained when the CPU 820 is subject to read-out instruction through the interface 800. The control of reproduction position is carried out by carrying out management of position on the disc of reproduction data by the system control CPU 820 to deliver, to the servo control circuit 814, a control signal to designate reproduction position on recording tracks of the magneto-optical disc 804.

Figure 3:
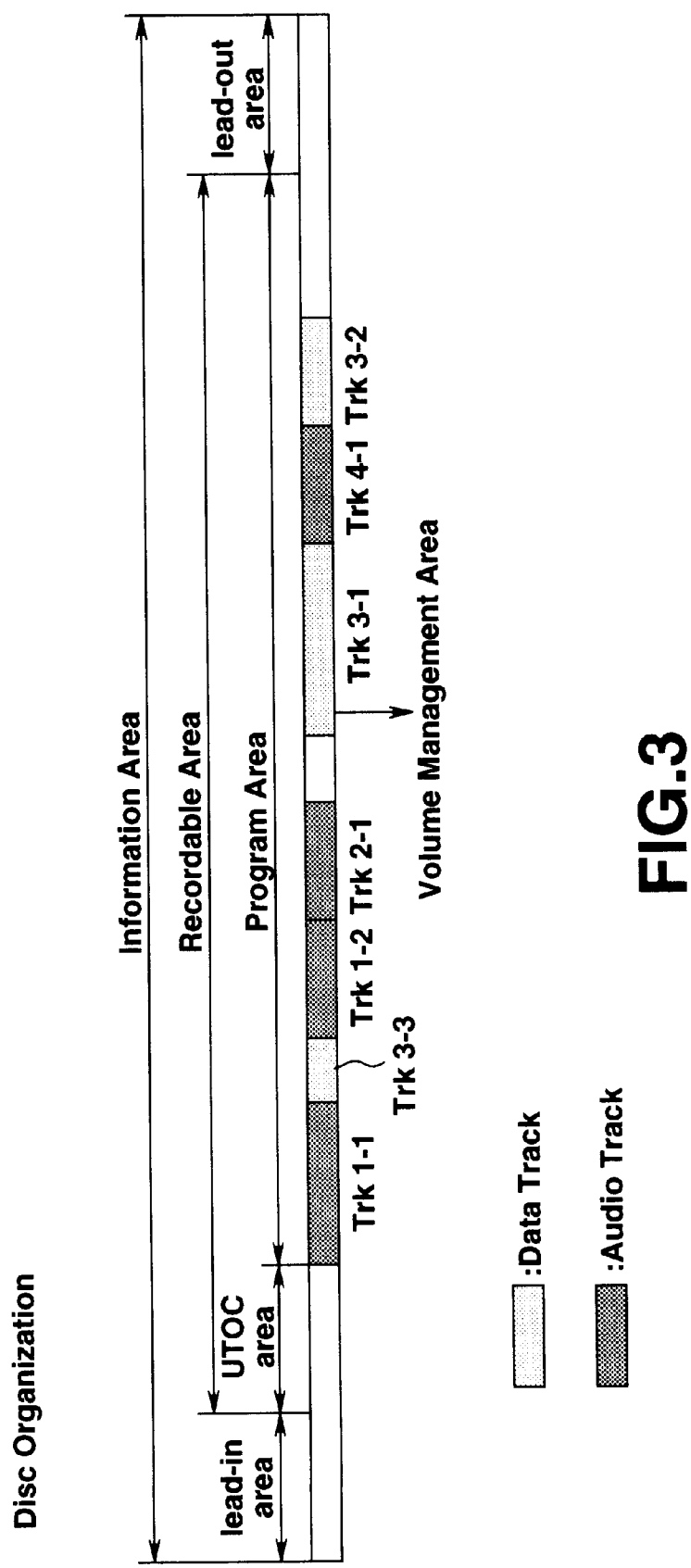
FIG. 3 is a view for explaining the format of magneto-optical disc 804 of FIG. 2.

FIG. 3 shows an example where audio data and computer data are recorded onto rewritable magneto-optical disc 804. As shown in the figure, at the innermost circumferential side and the outermost circumferential side of Information area from the innermost circumference (left side in the figure) up to the outermost circumference (right side in the figure), Lead-in area and Lead-out area are respectively provided. TOC (Table of Contents) data, etc. are recorded into the Lead-in area and the Lead-out area as occasion demands. General user cannot record information in these areas.

The area except for the Lead-in area and the Lead-out area of the information area is caused to be Recordable area, and general user can record data therein or reproduce it therefrom.

UTOC (User TOC) area is provided at the innermost circumferential side of the Recordable area, and Program area is provided at the outside thereof. UTOC data corresponding to recording data that user records into the Program area is recorded in the UTOC area. Audio data, data processed by computer and other data are adapted so that they can be recorded into the Program area.

In the Program area, respective data are discretely recorded as occasion demands. Respective areas discretely disposed (allocated) are called parts so that related parts form respective one tracks. In the embodiment of FIG. 3, audio data is recorded at track Trk1. Namely, this track Trk1 is caused to be audio track. This track Trk1 consists of two parts (Trk1-1, Trk1-2). While the parts (track) Trk1-1 and the parts Trk1-2 are formed at separate positions (locations) on the disc, for example, in the case where that data is reproduced, when reproduction of the parts Trk1-1 is completed, the optical pick-up 806 carries out seek for parts Trk1-2 to reproduce it. For this reason, reproduction data can be continuously obtained.

In this embodiment, in addition to the above, audio tracks Trk2 and Trk4 are respectively constituted with one parts Trk2-1 and Trk4-1 and audio data are recorded therein.

Further, in this embodiment, data track Trk3 consisting of parts Trk3-1 to 3—3 is formed, and data processed by the main CPU 14 is recorded therein.

The EFM·CIRC encoder/decoder 818 carries out processing so that data is caused to undergo recording and/or reproduction (hereinafter simply referred to as recording/reproduction) with cluster (64 K bytes) being as a unit with respect to respective data tracks of the program area.

The data track consists of Volume Management Area in which information for carrying out management of volume such as directory information, etc. are recorded, and Extent Area in which data of actual files are recorded. The volume management area is formed at the leading portion of a data track initially formed in the program area. The extent area is caused to be an area except for the above.

In this embodiment, the leading portion of the data track initially formed in the program area corresponds to the leading portion of the parts Trk3-1, and the volume management area is formed therein.

Allocation units of data of the volume management area and the extent area are caused to be subject to independent management. For example, the former is caused to be 2 k bytes, and the latter is caused to be value (e.g., 8 k bytes) which is selected from either one of 2 k bytes, 4 k bytes, 8 k bytes, 16 k bytes, 32 k bytes and 64 k bytes.

Figure 4:
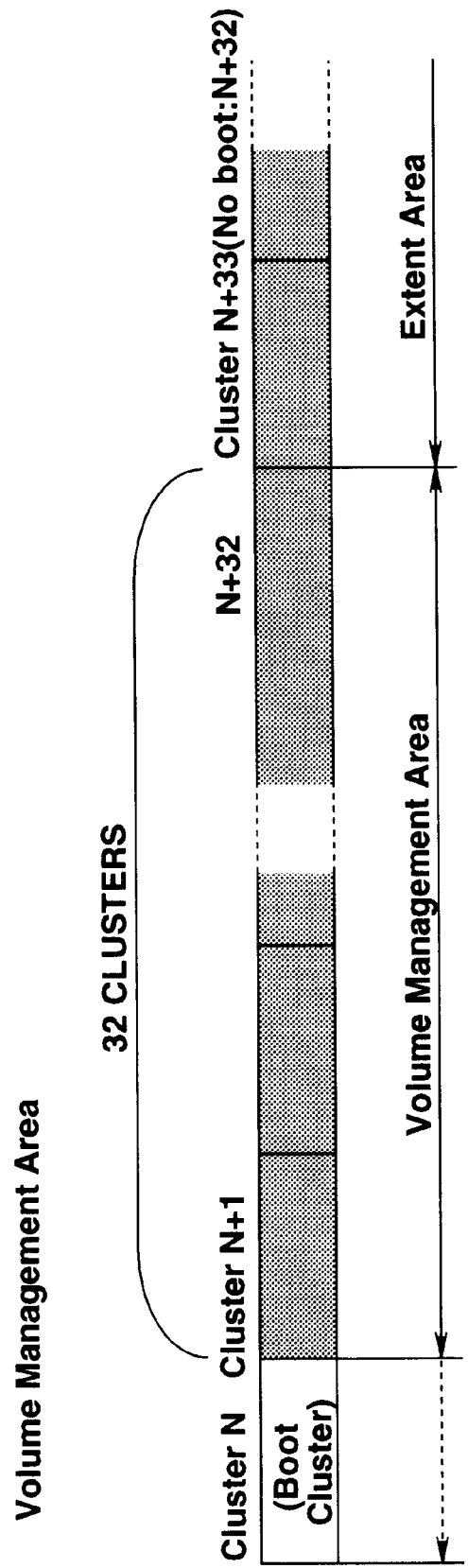
FIG. 4 is a view for explaining the format of data track of FIG. 3.

The Volume Management Area consists of 32 clusters as shown in FIG. 4. At a location preceding by one of the Volume Management Area, Boot-Cluster of one cluster is allocated.

Figure 5:
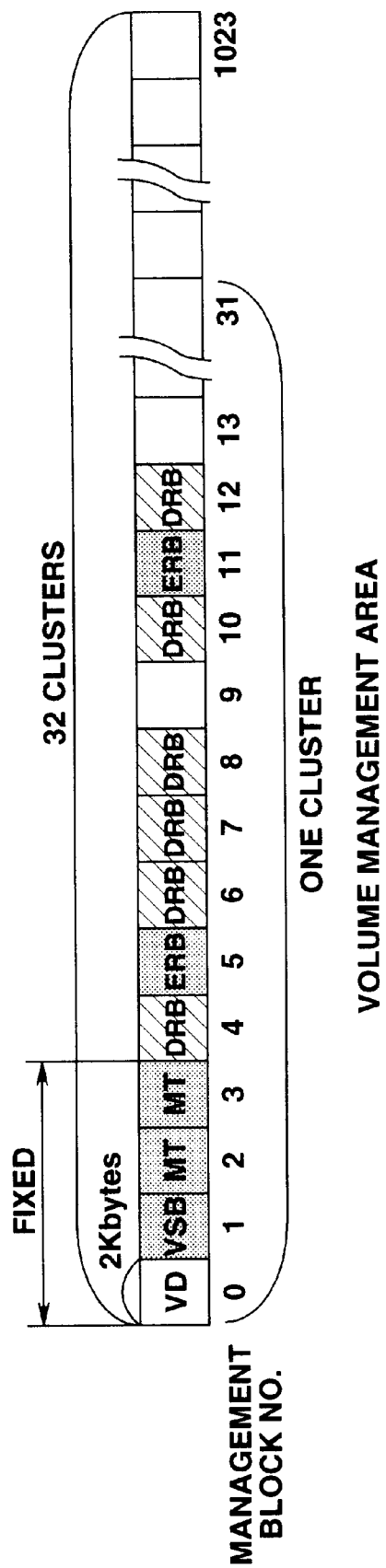
FIG. 5 is a view for explaining the format of volume management area of FIG. 4.

FIG. 5 represents the format of the Volume Management Area. Since the volume management area consists of 32 clusters, and one cluster consists of 64 k bytes, 1024 management blocks of 2 k bytes are formed in the volume management area, and numbers 0 to 1023 are attached in ascending order.

Volume Descriptor VD is recorded in the first management block of No. 0. In this Volume Descriptor VD, e.g., any value (4 in the case of this embodiment) of numbers (0 to 1023) of the management block in which root directory is recorded is recorded in addition to information with respect to the entirety of volume such as volume name and/or preparation date, etc.

In the management block of No. 1, Volume Space Bitmap (VSB) is allocated. Data indicating use state of the entirety of the magneto-optical disc 804 is recorded in the Volume Space Bitmap.

Namely, the Volume Space Bitmap carries out management of use circumstances (state) of the entirety of the disc (particularly the Extent Area) in allocation units called allocation block. The allocation block is caused to take any one of values of 2 k bytes, 4 k bytes, 8 k bytes, 16 k bytes, 32 k bytes and 64 k bytes. Thus, since allocation unit of the extent area is substantially designated, the allocation block is caused to have 8 k bytes in the case of this embodiment as described above. To all allocation blocks in the disc, allocation block numbers starting from 0 are attached in ascending order. By such number, absolute position on the disc is specified.

Figure 6:
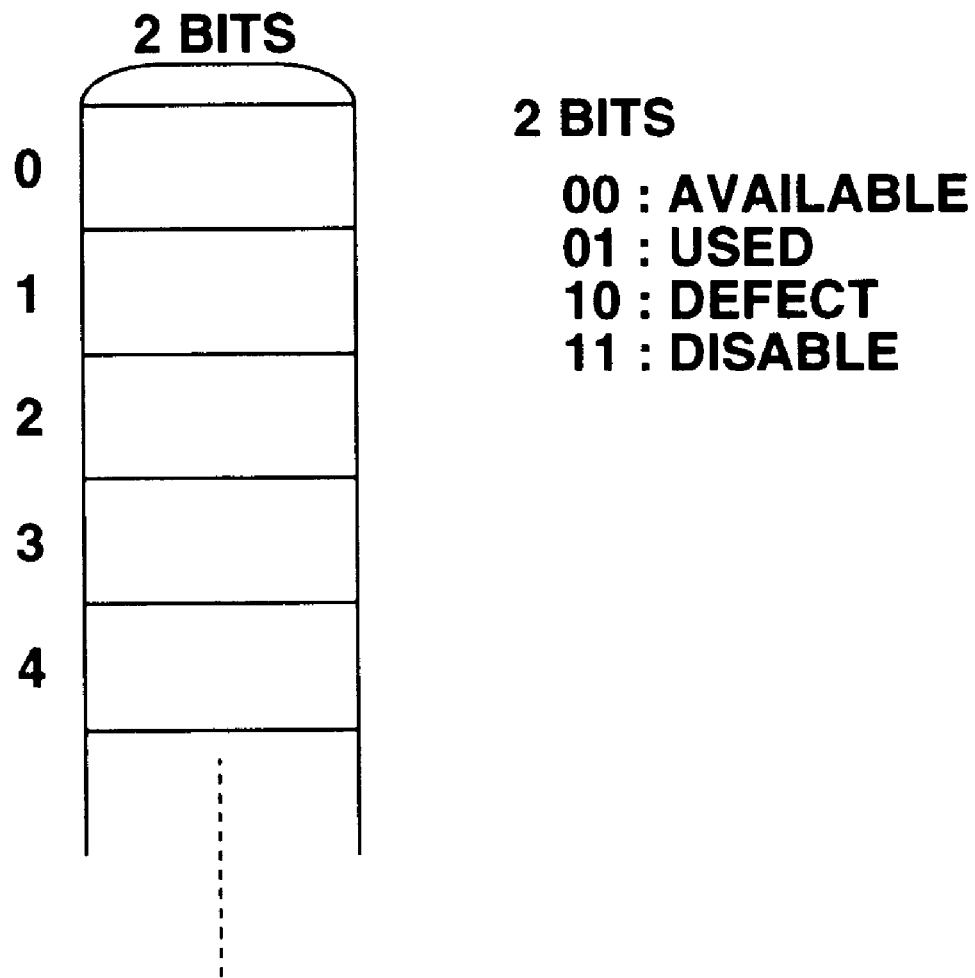
FIG. 6 is a view for explaining the configuration of volume space bitmap of FIG. 5.

The Volume Space Bitmap consists of entries of 2 bits to which numbers corresponding to numbers of respective allocation blocks are attached as shown in FIG. 6, for example, and respective entries are allocated in ascending order similarly to the allocation blocks. In the case where allocation of single management block is insufficient in order to represent all allocation blocks, Volume Space Bitmap is constituted with a plurality of management blocks.

Values of 2 bits of respective entries of the Volume Space Bitmap have the following meaning.

00 Available
01 Used
10 Defect
11 Disable

At the time of initialization of the disc, data tracks are prepared, and allocation blocks belonging to areas except for the data tracks are registered into the Volume Space Bitmap as disable (11). Boot Cluster and allocation blocks of the Volume management area are registered as used (01). Allocation blocks of the Extent Area are registered as available (00).

Data of file is registered into the extent area. In the case of recording data of file, an approach is employed to search for available (00) allocation block by the Volume Space Bitmap to record data into that allocation block thereafter to change a corresponding entry of the to Volume Space Bitmap to used (01). In the case where file is deleted, that entry is registered for a second time as available (00) allocation block. In this way, management of extent area is carried out by the Volume Space Bitmap.

To management blocks of 4 k bytes in total of No. 2 and No. 3 of FIG. 5, Management Tables are allocated. In this Management Table MT, use state of the volume management area is recorded.

FIG. 7 shows, in a model form, Management Table MT constituted by two Management Blocks of No. 2 and No. 3. As shown in the figure, respective entries of size (capacity) of 4 bytes indicated by numbers of 0 to 1023 correspond to Management Blocks of 2 k bytes indicated by numbers of 0 to 1023. Since four Management Blocks of numbers 0 to 3 shown in FIG. 5 are determined by the standard in advance, i.e., are fixed, fixed data determined in advance are recorded (are caused to be in reserved state) in corresponding four entries on the Management Table MT of FIG. 7.

As shown in FIG. 5, Directory Records Blocks or Extent Records Blocks are allocated to the Management Blocks of No. 4 and Blocks succeeding thereto.

One directory consists of one Directory Record Block DRB or more, and Directory Record as shown in FIG. 8 is recorded into the Directory Record Block DRB. The Directory Record consists of information for directory and/or information for file, and information as described below are respectively recorded therein.

Directory (Name, Index to DRB, ID, Size, Date, etc.)

File (Extent Record of File Data, Name, Index to ER (Index to ERB, Offset of ER), Extent Start Location, Number of Blocks, ID, Size, Date, etc.)

Extent Record of File Data is flag of 1 bit, and indicates whether or not file is represented by using Extent Record Block ERB by flag of 1 bit. Name indicates name of sub directory or file, ID indicates inherent number, Size indicate size, and Date indicates date of preparation thereof.

Index to DRB indicates, by any one of values of Nos. 0 to 1023 (No. of management block shown in FIG. 5), relative location (position) within volume management area of the first Directory Record Block DRB in which the content of sub directory is described.

Index to ER consists of Index to ERB and Offset of ER, wherein Index to ERB indicates, by any one of values (Nos. of management blocks shown in FIG. 5) of Nos. 0 to 1023, relative location (position) within volume management area of Extent Record Block ERB which describes allocation block where data of a predetermined file is recorded.

Offset of ER designates (indicates) any one of 64 Extent Records ER of Extent Record Block ERB shown in FIG. 14 by any one of numbers of 0 to 63 as described later.

Extent Start Location indicates, by No. of allocation block, start location (absolute location) of file recorded in the extent area. Number of Blocks indicates the number of allocation blocks of file starting from the start location.

It is to be noted that Index to ER of the above-mentioned information for file is recorded only when one file consists of a plurality of Extents (i.e., when one file consists of a plurality of separate (discrete) allocation blocks), and Extent Start Location is recorded only when one file consists of one Extent (i.e., one file consists of continuous allocation blocks).

FIGS. 9 to 12 show the format of Directory Records Block Entry of Management Table MT for carrying out management of recording of data of Directory Record Block DRB.

FIG. 9 shows the format of Directory Record Block Entry of Management Table MT in the case where only one Directory Record Block DRB exists. In this case, 0 is set at the first 31-th bit of data of 4 bytes, and ID is recorded at the remaining 31 bits from the 30-th bit to the 0-th bit. For example, Directory Record Block Entry corresponding to the management block of No. 4 of FIG. 5 is constituted with the format of FIG. 9 as shown in FIG. 7. In the case of this embodiment, 00000002 is recorded as ID. This ID indicates root directory.

In the case where directory consists of a plurality of Directory Record Blocks DRB, directory record block entry of Management Table MT corresponding to the first Directory Record Block DRB is constituted with a format as shown in FIG. 10, entry corresponding to the last Directory Record Block DRB is constituted with a format as shown in FIG. 12, and entries corresponding to Directory Record Block DRB therebetween are constituted with a format as shown in FIG. 11.

In the entry of FIG. 10, FO (hexadecimal number) indicating type of entry is recorded at the first 1 byte, and ID of 1 byte of the MSB side of ID of 4 bytes is recorded at the next (subsequent) 1 byte. Index to Next DRB of the next Management Block is allocated at the next 2 bytes.

In the entry of FIG. 11, FE indicating type of entry is allocated to the first 1 byte, and the next 1 byte is unused (reserved). Further, Index to next Directory Record Block DRB of the next management block is allocated to the remaining two bytes.

Moreover, in the entry of FIG. 12, FF indicating type of entry is allocated to the first 1 byte, and ID of the remaining 3 bytes except for MSB of 1 byte recorded at the second byte of FIG. 10 is recorded in the remaining 3 bytes.

Entries indicated by Nos. 7, 8 and 10 of FIG. 7 are respectively prescribed (provided) by the formats shown in FIGS. 10, 11 and 12. 0008 is recorded at the last 2 bytes of the entry corresponding to the management block No. 7. This indicates that the next Directory Record Block DRB in which related data is recorded is Directory Record Block DRB of the management block indicated by No. 8 (Accordingly, there is entry of No. 8 in relation to the entry of No. 7). Moreover, 000A (hexadecimal number) is recorded at the last 2 bytes of the entry of the management block corresponding to No. 8. This indicates that Directory Record Blocks DRB of the management block of No. 10 (value by hexadecimal notation corresponding to A of hexadecimal number) are continuous (Accordingly, entries of No. 10 are continuous).

Further, 00 is recorded at the second byte of the entry of No. 7 and ID of 000005 is recorded at the second to fourth bytes of the entry of No. 10. For this reason, it is eventually seen that ID of directory prescribed by these three entries is 00000005.

FIG. 13 shows the format of Extent Records Block Entry for carrying out management of Extent Record Block ERB of the Management Table MT of FIG. 7. In this format, 80 indicating type of entry is allocated to the first 1 byte, the remaining 2 bytes are caused to be unused (Reserved), and Used Count is allocated to the last 1 byte. This used count indicates the number of used Extent Records ER of records corresponding to Nos. of 0 to 63 of Extent Records Block of FIG. 14 which will be described later.

In the Management Table MT of FIG. 7, entries corresponding to Management Blocks indicated by No. 5 and No. 11 of FIG. 5 are respectively represented by the format of the Extent Record Block Entry shown in FIG. 13. In the case of the example of No. 5, value of 04 is recorded at the last 1 byte. This indicates that the number of used Extent Records ER of Extent Records ER indicated by 64 numbers of 0 to 63 of the Extent Record Block ERB shown in FIG. 14 is 4 (Respective extent records ER of numbers 0, 1, 2, 4 are in used state).

Figure 14:
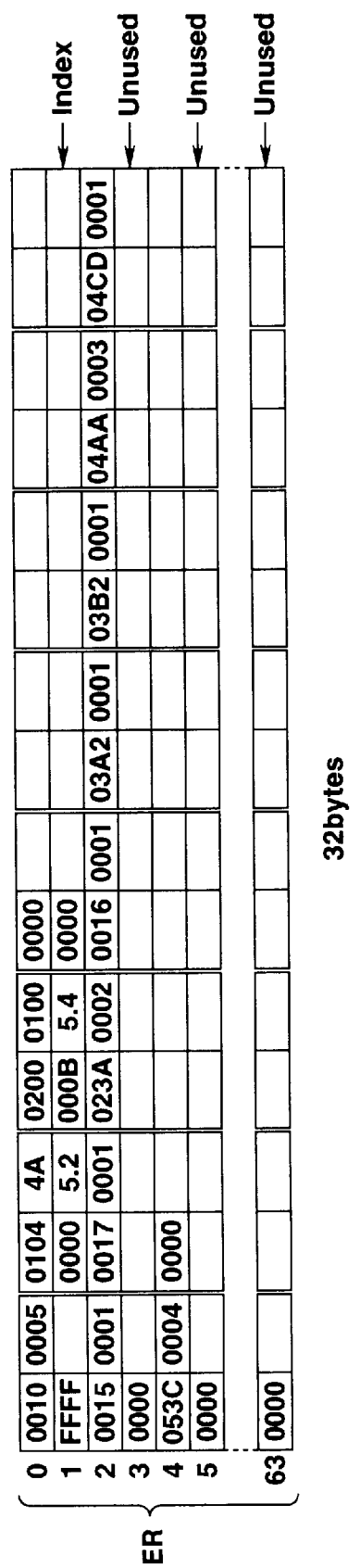
FIG. 14 is a view for explaining the configuration of the extent record block of FIG. 5.

The Extent Record Block ERB shown in FIG. 5 describes (location of) an allocation block in which data of file recorded in the extent area is recorded, and is constituted as shown in FIG. 14, for example. As shown in this figure, Extent Record Block ERB of 2 k bytes consists of 64 Extent Records ER respectively indicated by No. 0 to No. 63 of 32 bytes.

Each Extent Record ER is of a structure including data of 4 bytes where FFFF indicating that its Extent Record ER is index is recorded at the first 1 byte, and 7 Extent Record Indices collected shown in FIG. 15, or 8 Extent Descriptors of 4 bytes collected shown in FIG. 16.

As shown in FIG. 15, Logical Offset is allocated to the first 2 bytes of the Extent Record Index, Index to ERB is allocated to the next 10 bits, and Offset of ER is allocated to the last 6 bits.

In the extent area, data are recorded with the allocation block being as minimum unit of allocation. Logical Offset indicates where data indicated by Extent Record Index is located from the leading location within a file (relative location within the file), by relative number of allocation block within that file.

Moreover, the Index to ERB is caused to have configuration of 10 bits, and indicates relative location within volume management area of Extent Record Block ERB, by any one of values of Nos. 0 to 1023 (No. of the management block shown in FIG. 5).

Further, Offset of ER consists of 6 bits, and indicates any one of 64 four Extent Records ER of the Extent Record Block ERB shown in FIG. 14, by any one of numbers of 0 to 63.

As shown in FIG. 16, Extent Start Location is allocated to the first 2 bytes of the Extent Descriptor, and Number of Blocks is allocated to the remaining 2 bytes. This Extent Start Location indicates start location (absolute location) of file recorded in the Extent Area by No. of allocation block. In addition, No. of Blocks indicates the number of allocation blocks of file starting from its start location.

In FIG. 14, Extent Record ER of 32 bytes indicated by No. 1 indicates Extent Record Index. FFFF is recorded at the leading 2 bytes of the first 4 bytes. In the case of this embodiment, in the next 4 bytes, 0000 is allocated to the first 2 bytes as Logical Offset, 5 is stored as Index to ERB, and 2 is stored as Offset of ER.

The fact that Index to ERB is 5 indicates that No. of management block of the Extent Record Block ERB (shown in FIG. 14) is 5.

The fact that Offset of ER is 2 indicates that Extent Record ER indicated by No. 2 exists in FIG. 14. Further, the fact that its Logical Offset is 0000 indicates that No. (relative No.) of the first allocation block of file within its file, which is indicated by Extent Record ER represented by No. 2, is 0000 (i.e., the first allocation block constituting that file). In addition, in the Extent Record ER of No. 2, it is indicated that there exists one allocation block (of Number of Blocks) at the 15-th allocation block in terms of the absolute location (Extent Start Location) on data tracks at the leading portion thereof (left side in the figure) thereof, for example.

In the further next 4 bytes of Extent Record ER of 32 bytes indicated by No. 1, it is indicated that Offset of ER is 4. This indicates that data exists at Extent Record ER of No. 4 of Extent Records ER indicated by numbers 0 to 63. In the case of this embodiment, its Logical Offset is caused to be 000B (11 in terms of decimal number). Namely, in the embodiment of FIG. 14, sum total of the number of allocation blocks of Extent Record ER indicated by No. 2 becomes equal to 11 (=1+1+2+1+1+1+3+1) as described later. For this reason, at the location where Extent Start Location as an absolute location on the magneto-optical disc 804, which is recorded at Extent Record ER indicated by No. 4, is 053C, there exists a file starting from the twelfth block (relative allocation block No. 11).

It should be noted that while since one Extent Record ER can include only 7 Extent Record Indexes at the maximum in this embodiment as shown in FIG. 14, only 7 Extent Records can be designated, in the case where the number of Extent Records ER is increased more than that, other Extent Record Indices are further generated, so indices which collect a plurality of Extent Record Indices are further generated.

In order to use management block of the volume management area, an approach is employed to search for unused management block (management entry of 00000000) from the Management Table MT to register, in that entry, data of the format shown in FIGS. 9 to 13 in correspondence with use circumstances (state). In the case where a predetermined management block becomes unnecessary, 00000000 is registered into that entry. In this way, management of the volume management area is carried out by the Management Table MT.

Figure 17:
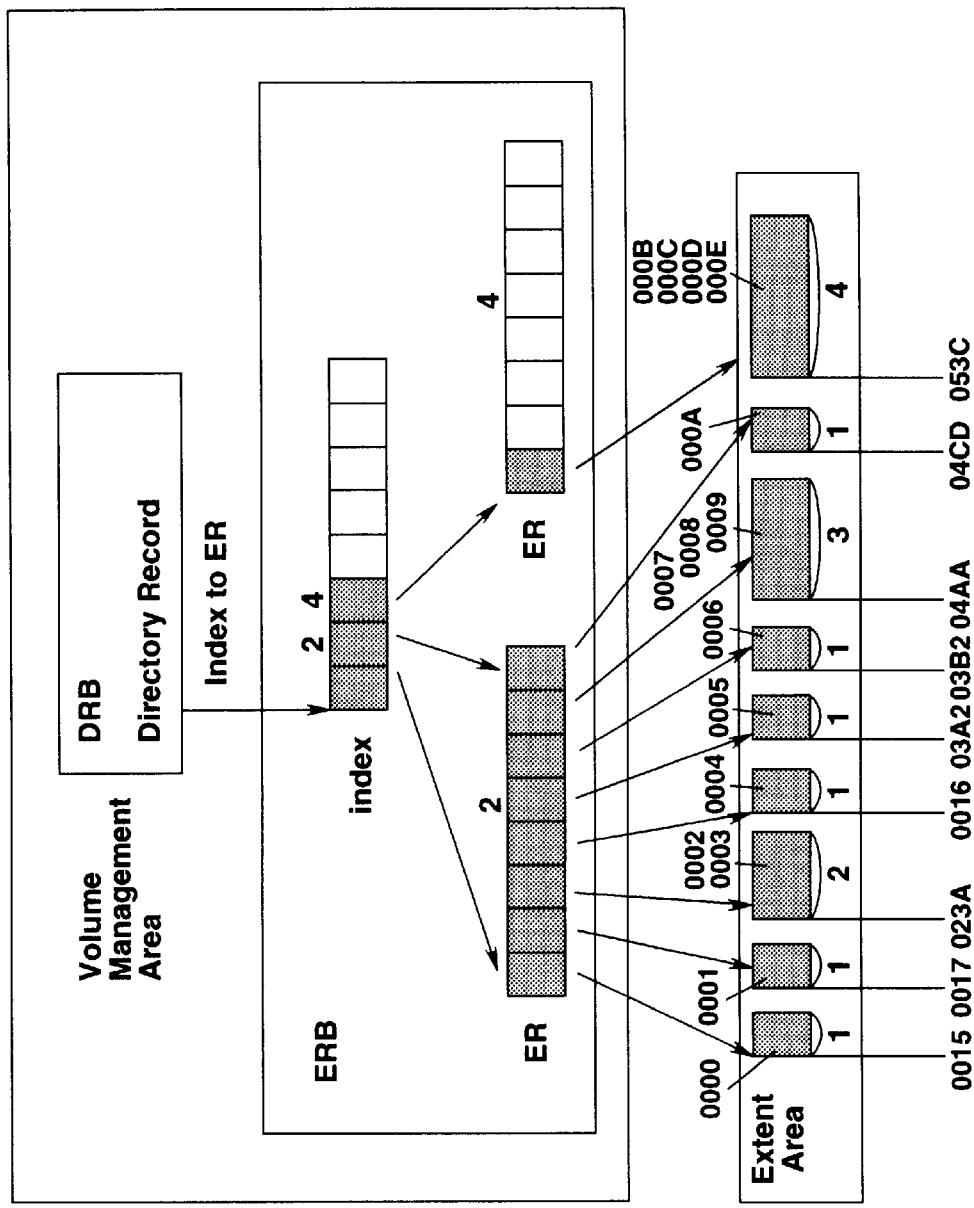
FIG. 17 is a view for explaining the relationship between index and extent record of the extent record block.

FIG. 17 shows, in a model form, the relationship between index and Extent Record ER recorded in the Extent Record Block ERB. As shown in the figure, from directory record for file (FIG. 8) of a predetermined Directory Record Block DRB (FIG. 5), Extent Record ER (FIG. 14) of a predetermined Extent Record Block ERB including Extent Record Index is designated by Index to ER. In the designated Extent Record ER, 7 Extent Record Indices are recorded at the maximum.

Further, in Extent Records ER designated by respective indices, Extent Descriptors consisting of information of start locations of 8 Extents (Extent Start Location) at the maximum and the number of allocation blocks (Number of Blocks) constituting those Extents are recorded. It is to be noted that while, in the above-described example, number of Extent Record ER including Extent Descriptor is indicated through Extent Record Index, in the case where the number of Extents constituting one file is 8 or less, it is possible to directly indicate Extent Record ER including Extent Descriptor by Index to ER.

As shown in FIGS. 14 and 17, it is described in the Extent Record ER of No. 2 that, from respective locations of allocation block numbers 0015, 0017, 023A, 0016, 03A2, 03B2, 04AA, 04CD, by 1 (relative block number 0000), 1(0001), 2(0002, 0003), 1(0004), 1(0005), 1(0006), 3(0007, 0008, 0009) and l(000A), i.e., 11 allocation blocks in total, a portion of one file is constituted. Further, it is described in the Extent Record ER of No. 4 that the remaining portion of the file subsequent thereto is constituted by 4 allocation blocks (of relative block No. 000B, 000C, 000D, 000E) from allocation block No. 053C. Namely, in the case of this example, one file consists of 15 allocation blocks in total.

Figure 18:
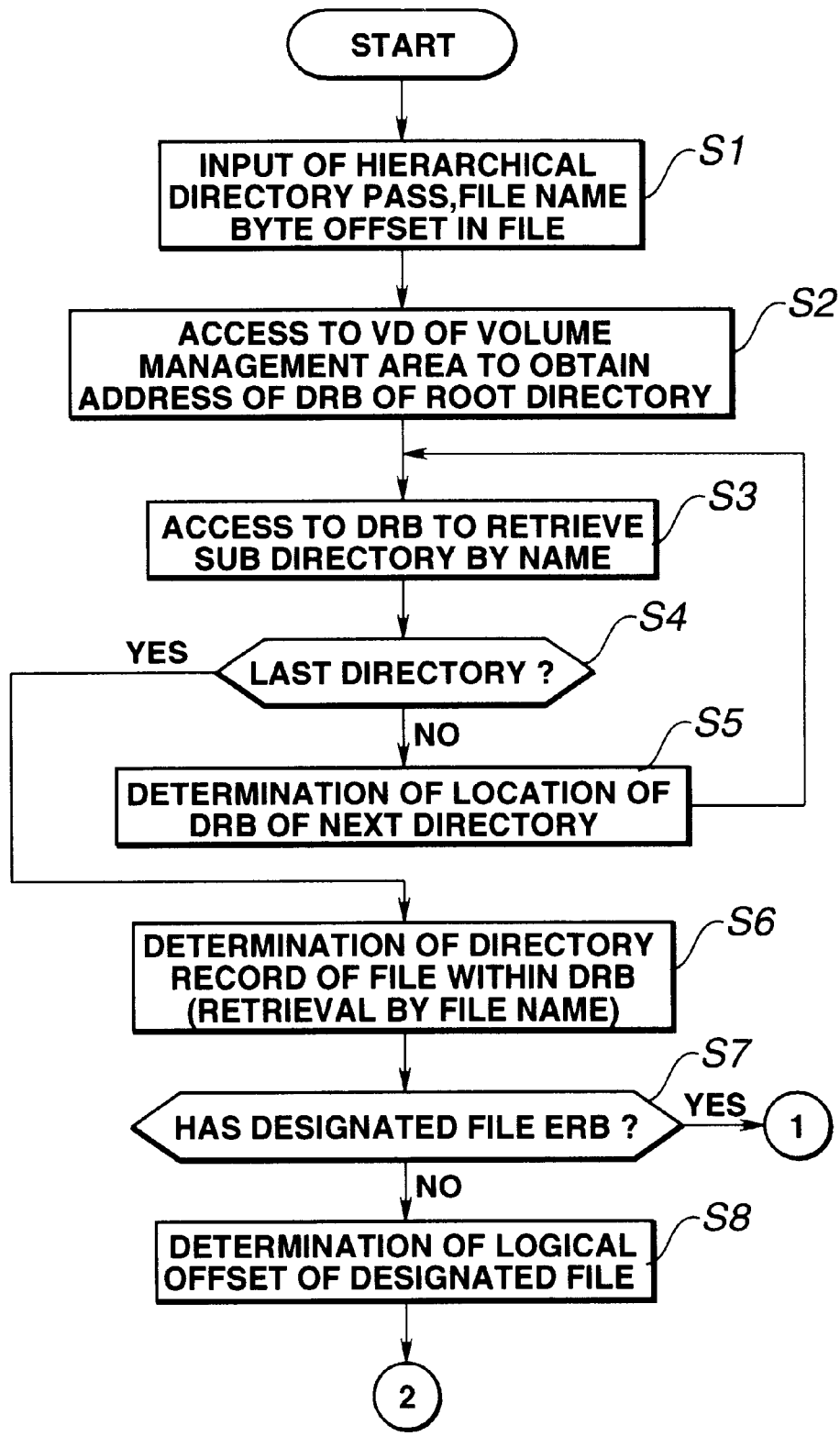
FIG. 18 is a flowchart for explaining the operation of the embodiment of FIG. 2.
Figure 19:
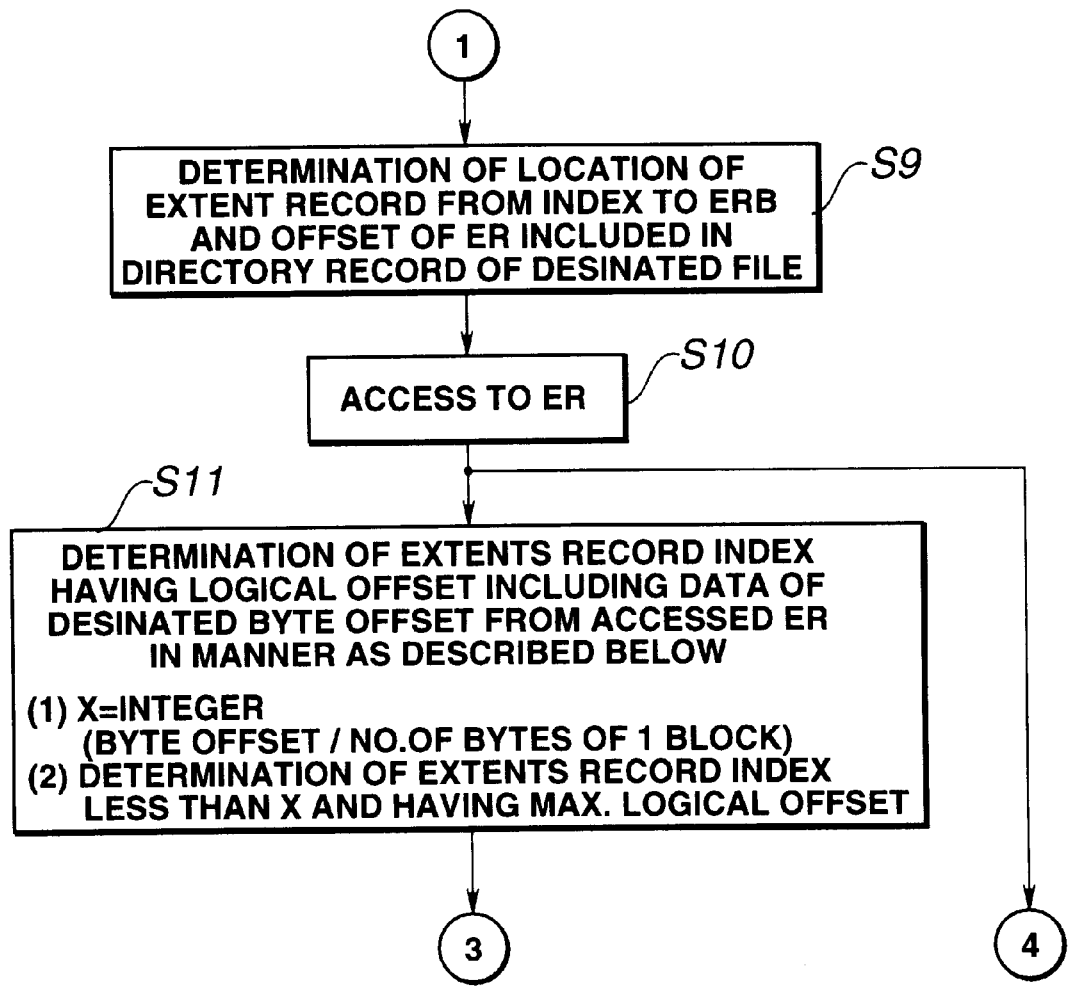
FIG. 19 is a flowchart succeeding to FIG. 18.
Figure 20:
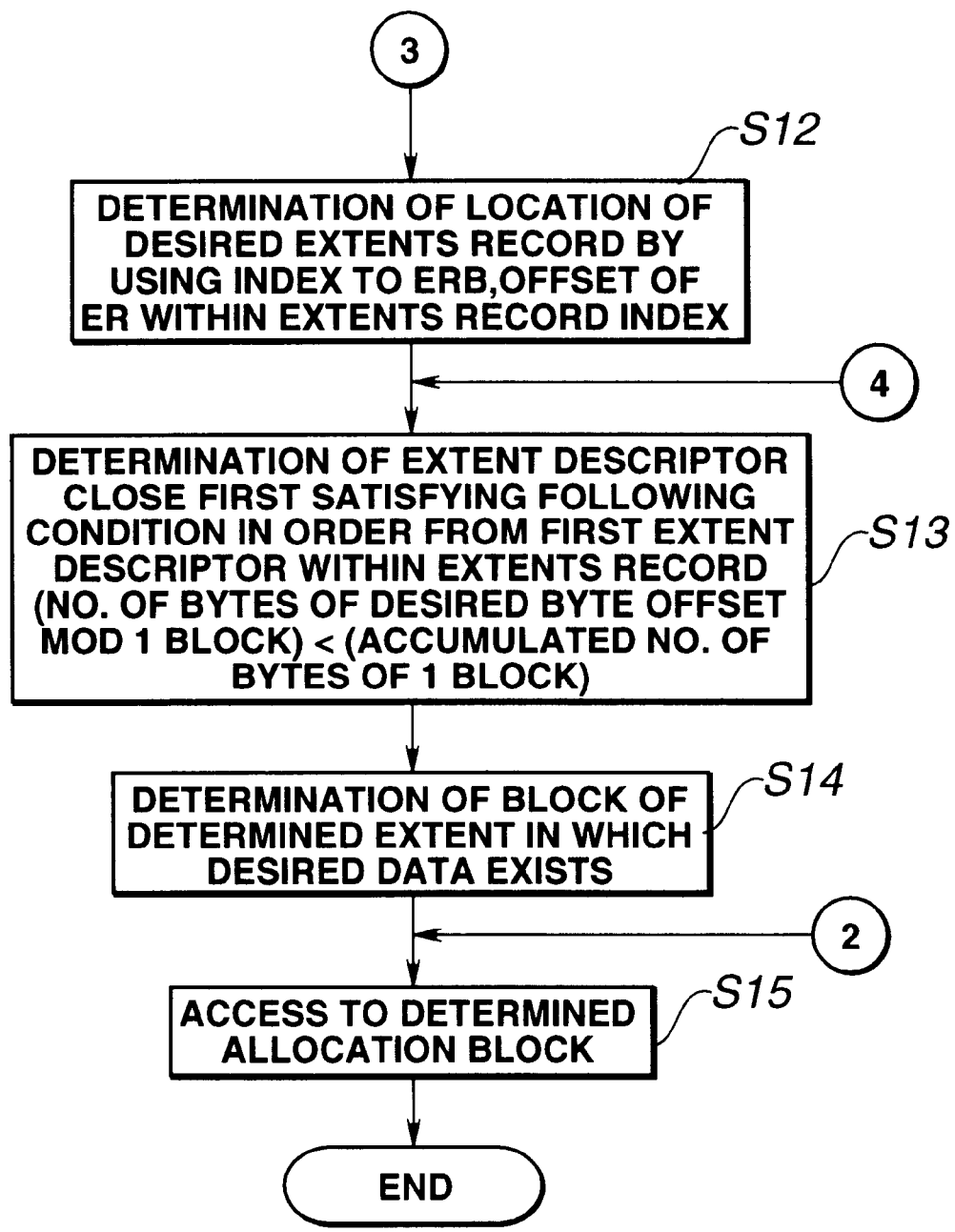
FIG. 20 is a flowchart succeeding to FIG. 19.

The operation for retrieving a predetermined data within a predetermined file will now be described with reference to the flowcharts of FIGS. 18 to 20. In this case, it is assumed that data of the volume management area is read out when the magneto-optical disc 804 is loaded and has been caused to undergo buffering in the RAM 18.

Initially, at step S1, hierarchical directory pass, file name and Byte Offset of data to be retrieved within file from root directory consisting of plural sub directory names are inputted to the main CPU 14 through the input unit 10. The processing operation then proceeds to step S2. The main CPU 14 provides an access to Volume Descriptor VD (FIG. 5) of the volume management area stored in the RAM 18 thus to obtain address of Directory Record Block DRB of root directory. Namely, number of Directory Record Block DRB in which root directory is recorded of the management blocks indicated by numbers of 4 to 1023 in FIG. 5 is determined.

The processing operation then proceeds to step S3. The main CPU 14 provides an access to the management block (Directory Record Block DRB) of the number determined at the step S2 within the volume management area stored in the RAM 18. Then, the main CPU 14 retrieves sub directory recorded in that Directory Record Block DRB by the name thereof. At step S4, the main CPU 14 judges whether or not a current directory of the directories inputted at the step S1 reaches the last directory of the hierarchical directory pass inputted at the step S1. As a result, if the current directory has not yet reached the last directory, the processing operation proceeds to step S5. Thus, the main CPU 14 determines location of the next Directory Record Block DRB from the current Directory Record Block DRB. Then, the processing operation returns to the step S3. Thus, an access to Directory Record Block DRB at the location determined at the step S5 is carried out.

When the above-mentioned processing operation of the steps S3 to S5 are repeatedly carried out, whereby it is judged at the step S4 that current directory has reached the last directory, the proceeding operation proceeds to the subsequent step S6. Thus, the main CPU 14 determines a directory record of file from name of file within that Directory Record Block DRB. Namely, the main CPU 14 determines entry of the designated file.

Then, the processing operation proceeds to step S7. At this step, the main CPU 14 determines, from Extent Record of File Data of directory record for file, whether or not the designated file has Extent Record Block ERB. In the case where the designated file has Extent Record Block ERB, the processing step proceeds to step S9. Thus, the main CPU 14 determines location of Extent Record ER from Index to ER (Index to ERB, Offset of ER) included in the directory record of the file determined at the step S6. Then, the processing operation proceeds to step S10. Thus, the main CPU 14 provides an access to the Extent Record ER determined at the step S9 within the volume management area stored in the RAM 18.

Thus, the main CPU 14 judges, from the content of the obtained Extent Record ER, whether it is Extent Record Index or Extent Descriptor. In the case of the Extent Record Index, the processing operation proceeds to step S11. In the case of the Extent Descriptor, the processing operation proceeds to step S13.

At the step S11, the main CPU 14 determines, from the Extent Record ER accessed at the step S10, Extent Record Index having Logical Offset including data of Byte Offset designated at the step S1 in a manner as described below.

Initially, the Byte Offset designated at the step S1 is divided by the number of bytes (8 k bytes in the case of this embodiment) of 1 allocation block as allocation unit of the extent area in which file is recorded. Integer of quotient thus obtained is assumed to be X. Then, Extent Record Index less than the obtained value X and having the maximum Logical Offset (FIG. 15) is determined.

By the processing of the step S11, the index (Extent Record Index) shown in FIG. 17 is obtained.

Then, the processing operation proceeds to step S12. Thus, the main CPU 14 determines a location of a desired Extent Record ER by using Index to ERB and Offset of ER (FIG. 15) within the Extent Record Index determined at the step S11. Namely, the main CPU 14 determines a location of an Extent Record ER of a predetermined number of numbers of 0 to 63 shown in FIG. 14. Thus, any one of Extent Records ER shown in FIG. 17 is determined.

Then, the processing operation proceeds to step S13. The main CPU 14 determines Extent Descriptor close first which satisfies the following condition in order of the first Extent Descriptor (FIG. 16) within the Extent Record ER determined at the step S12 or the step S10. Namely, the main CPU 14 determines value obtained by modulo-adding byte offset designated at the step S1 by the number of bytes of one allocation block, i.e., remainder obtained as the result of dividing byte offset by the number of bytes of one allocation block. Further, the numbers of blocks (Numbers of Blocks) within that Extent Record ER are successively accumulated to determine value obtained by multiplying that accumulated number by the number of bytes of one allocation block. Then, Extent Descriptor which satisfies the condition where the above-described remainder is smaller than the multiplied value is determined.

Namely, in the example of FIG. 17, Extent Record ER indicated by, e.g., No. 4 is determined at step S12. Then, at step S13, the first Extent Descriptor of the Extent Record ER of, e.g., No. 4 is determined on the assumption that this Extent Descriptor satisfies the above-described condition. Namely, the processing of the step S13 is to judge which any one of 8 Extent Descriptors designates an Extent in which a desired Byte Offset exists.

Then, the processing operation proceeds to step S14. The main CPU 14 determines, from the Extent Descriptor and the remainder determined at the step S13, an allocation block in which data designated by the desired Byte Offset exists.

Further, the processing operation proceeds to step S15. The main CPU 14 instructs the magneto-optical recording/reproducing unit 8 to provide an access to a location on the disc corresponding to the allocation block determined at the step S14.

On the other hand, in the case where it is judged at the step S7 that a file to be retrieved has no Extent Record Block ERB, the processing operation proceeds to step S8 and the main CPU 14 determines, from the Extent Start location of the Directory Record of the file determined at the step S6 and the Byte Offset inputted at the step S1, Logical Offset including that Byte Offset, i.e., number of allocation block including that Byte Offset. Then, the processing operation proceeds to step S15, and the main CPU 14 instructs the magneto-optical recording/reproducing unit 8 to provide an access to a location on the disc corresponding to that allocation block. While, in the above-described embodiment, an approach is employed to allow data of the volume management area to undergo buffering into the RAM in advance to provide an access to data of the RAM 18 to carry out retrieval of directory, an approach may be employed to provide accesses to the magneto-optical disc 804 every time at respective steps to carry out retrieval of directory.

Figure 21:
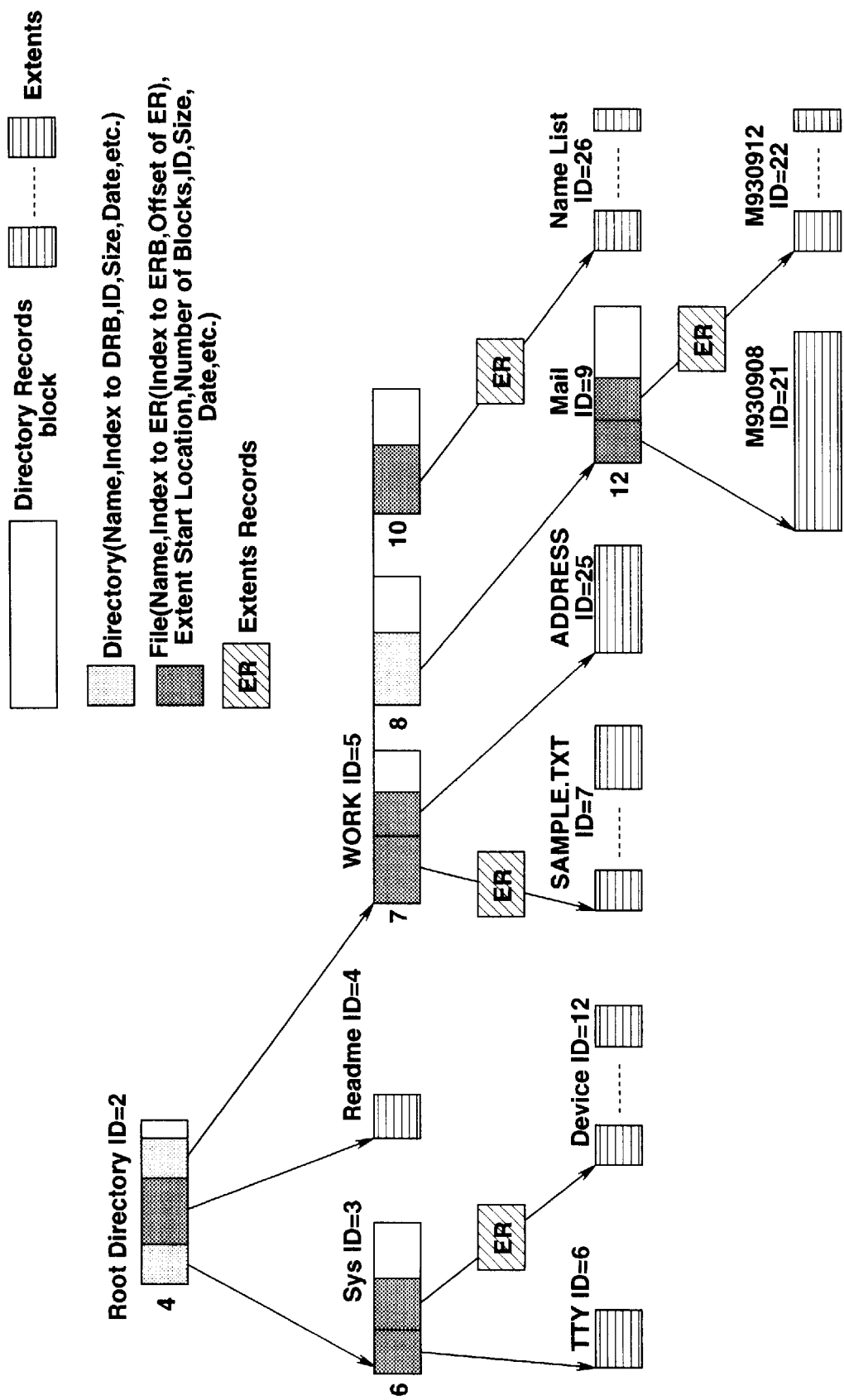
FIG. 21 is a view for explaining processing operation of FIGS. 18 to 20.

FIG. 21 shows, in a model form, processing in the case of retrieving file in a manner as stated above. As shown in this figure, root directory where ID is 2 is initially determined from description of the Volume Descriptor VD (FIG. 5). In the case of this example, this root directory is recorded in the Directory Record Block DRB of the management block indicated by No. 4 of numbers of 0 to 1023 in FIG. 5. Two directory records for directory are recorded in the Directory Record Block DRB of the management block of No. 4, and the fact that Directory Record Block DRB where sub directory is recorded exists in the management blocks of No. 6 and No. 7 is described by Index to DRB (FIG. 8) in respective directory records.

In the Directory Record Block DRB of the management block of No. 6, sub directory of name Sys where ID is 3 is recorded. In the Directory Record Block DRB of the management block of No. 7, sub directory of name WORK where ID is 5 is recorded.

Further, in the Directory Record Block DRB of the management block of No. 4, management information of file (directory record for file) of name Readme where ID is 4 is also recorded. Accordingly, it becomes possible to immediately provide, from the root directory, an access to the file Readme.

In the case where Extent constituting file is one, i.e., one file is constituted with continuous allocation blocks in a manner stated above, it is possible to immediately provide an access from Directory Record Block DRB without allowing Extent Record ER to intervene.

On the contrary, file of name Device where ID is 12 is constituted by plural Extents, i.e., plural allocation blocks existing at separate locations that file is retrieved through Index to ER (FIG. 8) from Directory Record Block DRB of the management block of No. 6.

Moreover, in this embodiment, the directory of name of WORK is successively described not only into Directory Record Block DRB of management block of No. 7, but also into Directory Record Block DRB of management blocks of No. 8 and No. 10. In Index to DRB (FIG. 8) of the Directory Record Block DRB of the management block of No. 8, Directory Record Block DRB of management block of No. 12 is further described. In the Directory Record Block DRB of the management block of No. 12, file management information of file M930908 (directory record for file of FIG. 8) where ID is 21 is described.

In a manner as described above, the file management information of the file M930908 is described in the Directory Record Block DRB of the management block of No. 12, management information of the Directory Record Block DRB of the management block of No. 12 is described in the Directory Record Block DRB of the management block of No. 8, management information of directory consisting of the Directory Record Block DRB of the management block of No. 8 and the Directory Record Block DRB of the management block of No. 7 is described in the Directory Record Block DRB of the management block of No. 4, and link information of the management blocks of No. 7 and No. 8 is described in the Management Table MT. Accordingly, location information of the file M930908 can be obtained through respective Directory Record Blocks DRB of the management blocks of Nos. 4, 7, 8, 12.

As described above, Volume Descriptor VD describes management block No. of the leading Directory Record Block DRB constituting root directory. In directory record recorded in parent directory of directory in the Directory Record Block DRB of that management block No., management block No. of the leading Directory Record Block DRB constituting the content of that directory is described.

Moreover, in the case where directory consists of plural Directory Record Blocks DRB, link information (Index to next DRB) (FIGS. 10, 11) indicating Directory Record Block DRB constituting the next portion is described in the entry of the Management Table MT of the leading and intermediate Directory Record Blocks DRB.

In a manner stated above, by the Volume Descriptor VD (FIG. 5) which carries out management of the entirety of volume, location within the volume management area of the root directory is described, and location within the volume management area of the sub directory is described in the root directory (parent directory). Such descriptions are successively repeated to construct hierarchical directory structure.

For example, Volume Descriptor VD indicates that the leading Directory Record Block DRB of root directory is the management block 4 of FIG. 5. Thus, it is seen that the root directory mentioned above consists of one Directory Record Block DRB (FIG. 7). Index to DRB (FIG. 8) of several directory records in the root directory describe location of sub directory, and the leading directory record allows the management block of No. 6 to be recording location of sub directory. It is seen that the sub directory described above also consists of one Directory Record Block DRB (FIG. 7).

Moreover, Index to DRB (FIG. 8) of another directory record in this root directory describes location of sub directory, and indicates that the leading directory record thereof is management block of No. 7. Entry (FIG. 7) of the management block of No. 7 is the leading Directory Record Block DRB, and link information of this entry indicates 0008, i.e., management block of No. 8.

It is further seen that Directory Record Block DRB of the management block of No. 8 is intermediate block, and link information of this entry indicates management block of No. 10 by 000A (hexadecimal number). Further, it is seen that Directory Record Block DRB of the management block of No. 10 is the last Directory Record Block DRB (FIG. 7).

These two sub directories respectively correspond to sub directory names Sys and WORK of FIG. 21.

The Directory Record Block DRB and the Extent Record Block ERB are collectively recorded, as described above, within the range of the volume management area consisting of successive 32 clusters. Namely, they are not recorded into the extent area. Accordingly, it is possible to quickly obtain directory management information and file management information.

Moreover, since which allocation block of the extent area constitutes file is recorded, as Extent Descriptor (FIG. 16), into Extent Record Block ERB of the volume management area, this is permitted to undergo buffering along with directory information. Thus, high speed read-out operation of file data can be made.

Accordingly, this embodiment can provide effects/advantages as described below.

(1) Realization of high speed of retrieval of hierarchical directory

Since hierarchical directory information is recorded into a concentrated area (volume management area) and its structure is simple, movement distance of seek and the number of seek operations of the head of the magneto-optical (recording/reproducing) unit, which takes place at the time of retrieval of directory, are reduced, thus making it possible to retrieve the directory. Accordingly, such scheme is effective, e.g., in retrieval of directory in the case of the configuration in which directory information of the recording media caused to be frequently subject to exchange is not caused to buffering into the memory at the time of exchange of recording medium. In addition, such a scheme is particularly effective in recording media in which seek time of the recording/reproducing unit is generally low.

(2) Efficient management of directory information

Even in the case where allocation block is enlarged (e.g., is caused to have 64 k bytes) (it is to be noted that such enlargement is effective generally in the case where file size is large because utilization efficiency of capacity of the recording medium is lowered), and directory is utilized only by about 1 sector (2 k bytes) in order to prevent lowering of file read/write speed resulting from the fact that data of file is recorded into the distributed allocation blocks, management unit of file (allocation block) and management unit of volume information (volume management area) such as directory, etc. are caused to be independent each other. Accordingly, it is possible to record volume management information such as directory, etc. into a relatively small area.

(3) High speed write operation in the case where minimum unit of record(ing) is large, such as, for example, MD In MD, minimum write unit (cluster) at the time of recording is considerably large value of 64 k bytes when considered from a viewpoint of comparison with the fact that hard disc, etc. has 512 bytes. For this reason, a buffer corresponding to one cluster is ordinarily prepared as a memory to write data of the buffer at a time. Accordingly, even in the case of re-write operation of only partial data of 1 cluster, it is necessary to once read data of one cluster into the buffer thereafter to carry out updating of a portion of the data in the buffer thereafter to carry out write operation of data in the buffer. In this case, since it takes 0.5 sec. or more in read-in and write operations in the MD, it takes one sec. or more for write operation of cluster. If management information of directory are assumed to be recorded in a distributed manner, into plural clusters spaced to each other, plural numbers of read and write operations corresponding to one cluster are required. Thus, it takes much time.

However, in the management method of this embodiment, since directory management information are concentrated, it is possible to carry out read-in operation of a greater quantity of directory management information as compared to the above-mentioned case by one time of read-in operation corresponding to one cluster. Thus, it is possible to carry out updating of directory by relatively small numbers of read and write operations, i.e., in a short time.

Moreover, since the management area of the directory is reduced, utilization efficiency of buffer of cluster of this area is increased. For this reason, since greater quantity of directory information is caused to undergo buffering at a time, most of retrieval of directory can be carried out by data in the memory. Thus, high speed retrieval operation can be realized.

While, in the above-described embodiment, explanation has been given by taking the example of rewritable MO disc as a recording medium, in the case where, in a hybrid disc where rewritable areas and write disable areas are mixed, or an optical disc of the write once type adapted so that recording can be made, but rewrite operation cannot be made (only one recording can be made), etc., directory information has been already recorded in the write disable area or the rewrite disable area, a recording medium as described above may be used in such a manner to copy corresponding directory information to a rewritable area or a new recording area thereafter to update (rewrite) directory information recorded in that area as occasion demands.

Figure 22:
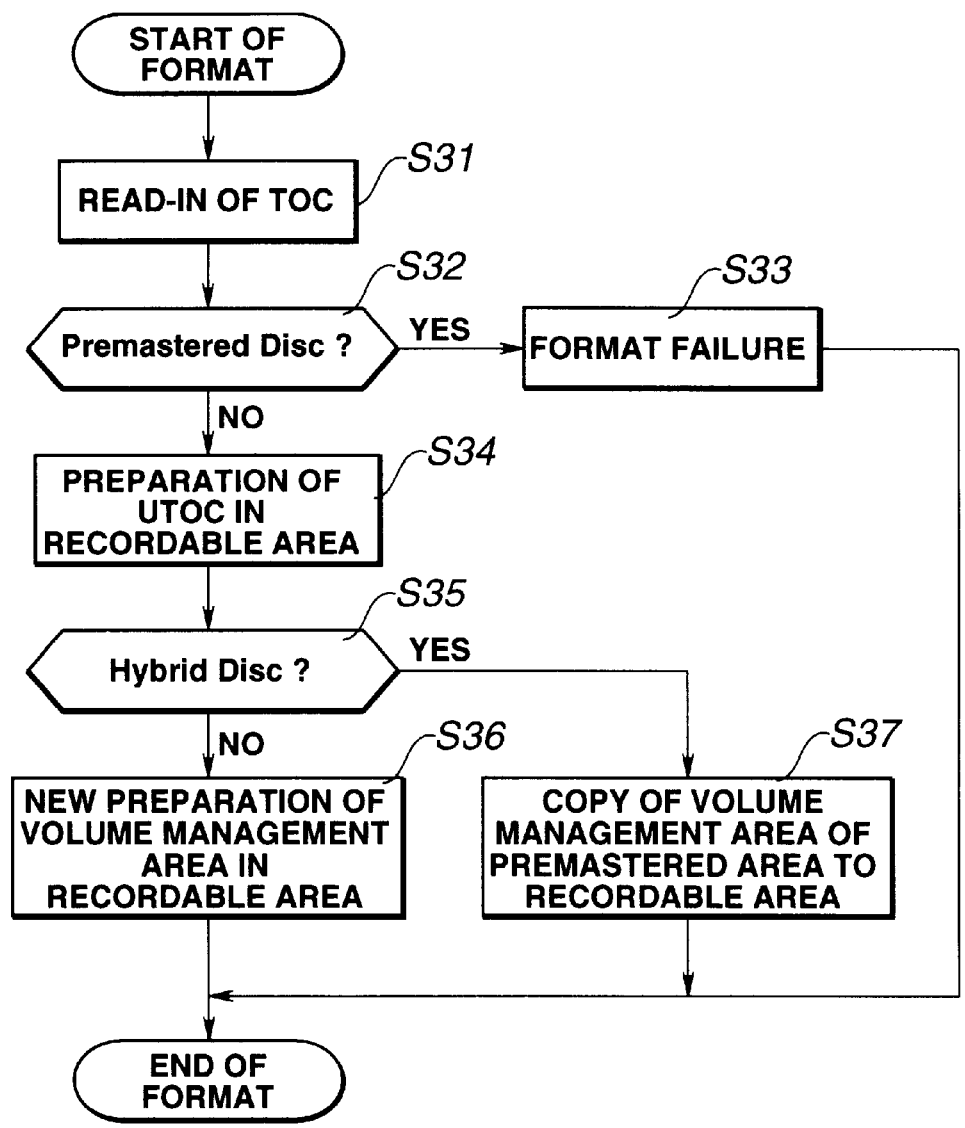
FIG. 22 is a flowchart for explaining the operation at the time of format of the magneto-optical disc.

FIG. 22 shows an example of processing of a format of such a case. Initially, at step S31, the main CPU 14 reads TOC therein. Of course in the hybrid disc, or in either a premastered disc (reproduction only disc) or an ordinary MO disc adapted so that recording/updating can be made, such TOC is formed in advance in the premastered area. Discrimination information indicating type of disc is recorded in the TOC. It is possible to recognize, from data of the TOC, whether corresponding disc is a disc of the hybrid type, a premastered disc, or an ordinary MO disc.

In view of the above, at step S32, the main CPU 14 judges whether or not a disc loaded now is premastered disc. In the case where the loaded disc is premastered disc, this disc is a reproduction only disc and there is no necessity of format. For this reason, the processing operation proceeds to step S33. The main CPU 14 executes processing (error processing) that it is not required to carry out format.

On the contrary, in the case where it is judged that the loaded disc is not premastered disc (it is judged that the loaded disc is hybrid disc or ordinary MO disc), the processing operation proceeds to step S34. The main CPU 14 instructs the magneto-optical recording/reproducing unit 8 to prepare UTOC in that recordable area. The magneto-optical recording/reproducing unit 8 prepares UTOC on the loaded magneto-optical disc 804 on the basis of the above-mentioned instruction. At step S35, the main CPU 14 judges whether or not disc loaded now is hybrid disc. In the case where it is judged that the loaded disc is not hybrid disc (in the case where the loaded disc is ordinary MO disc where all areas are formed as a recordable area except for recording area of TOC), the processing operation proceeds to step S36. The main CPU 14 instructs the magneto-optical recording/reproducing unit 8 to prepare volume management area. The magneto-optical recording/reproducing unit 8 newly prepares a volume management area in the recordable area of the loaded magneto-optical disc 804 on the basis of the above-mentioned instruction.

On the contrary, in the case where it is judged at step S35 that a disc loaded now is hybrid disc, the processing operation proceeds to step S37. The main CPU 14 instructs the magneto-optical recording/reproducing unit 8 to make copy of volume management area. The magneto-optical recording/reproducing unit 8 reads volume management area formed in advance by pre-pits from premastered area on the magneto-optical disc 804 to copy it to recordable area.

An approach is employed to copy volume management area to the recordable area to carry out, at times subsequent thereto, management of file on the basis of data of the volume management area recorded in the recordable area in a manner stated above (at the time of recording file into the recordable area, that management information is recorded into the volume management area), thereby making it possible to unitarily carry out management of the file recorded in advance in the premastered area and the file newly recorded in the recordable area.

Figure 23:
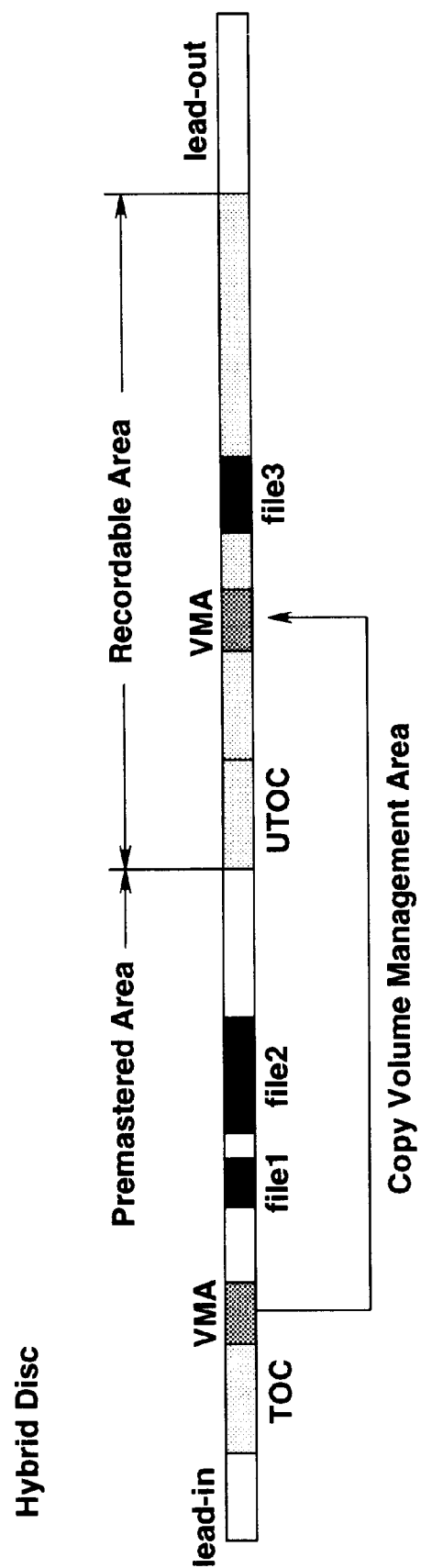
FIG. 23 is a view of a hybrid disc for explaining processing shown in the flowchart of FIG. 22.

FIG. 23 shows, in a model manner, the state where volume management area recorded in advance in the premastered area formed by pre-pits is copied to the recordable area.

In this embodiment, file 1 and file 2 are recorded into the premastered area, and file 3 is recorded into the recordable area. In the volume management area copied to the recordable area, directory management information and file management information of the file 1 and the file 2 of the premastered area are recorded in advance. When these information are updated so as to include directory management information and file management information of file 3 newly recorded in the recordable area to record them into the recordable area, it becomes possible to unitarily carry out management of all files recorded in the premastered area and the recordable area by using the above-mentioned volume management area.

Figure 24:
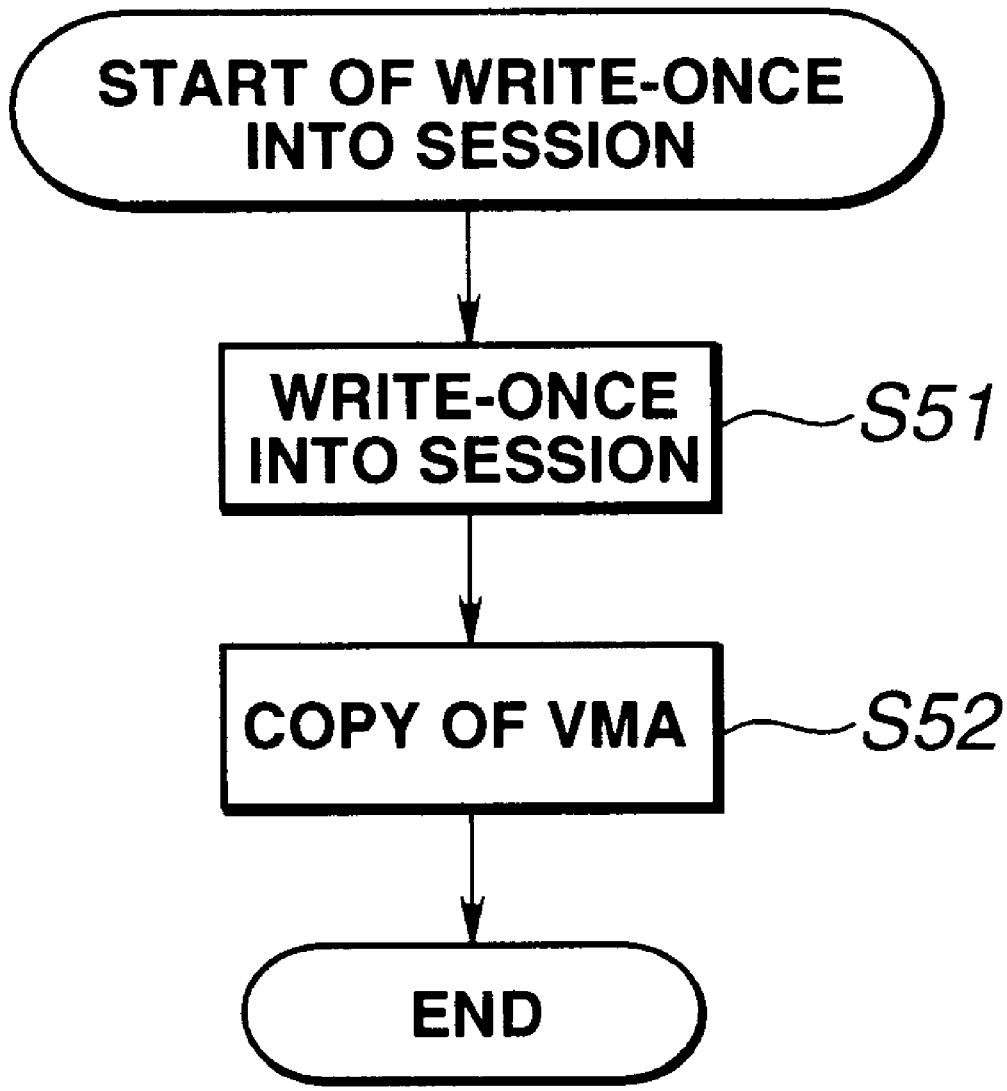
FIG. 24 is a flowchart for explaining recording processing of a disc of the write once type.

FIG. 24 shows an example of processing of a write-once type disc. In this case, at step S51, write-once operation into session is carried out. The session referred to here is (recording or storing) unit (area) of information recorded once. Then, the processing operation proceeds to step S52 to read out volume management area recorded in the session immediately before to include directory management information and file management information of file written once at the step S51 to the content of the volume management area to write once, i.e., record them into a new session.

Figure 25:
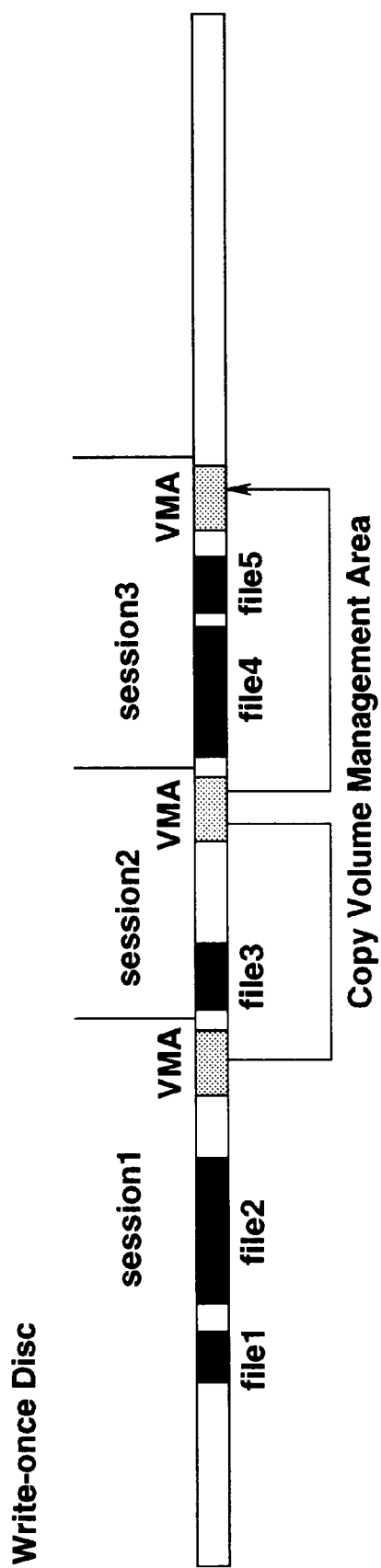
FIG. 25 is a view for explaining the processing of the flowchart of FIG. 24.

FIG. 25 shows, in a model form, the operation for writing once session in this way. Namely, at session 1, file 1 and file 2 are recorded. At this time, a volume management area including directory management information and file management information for carrying out management of the file 1 and the file 2 are recorded into the session 1 at the same time. At the time of recording file 3 in the next session 2, volume management area of the session 1 is read out to add directory management information and file management information of file 3 to the volume management area thus read out to record it into the session 2 along with data of the file 3.

Further, in the case of recording file 4 and file 5 in session 3, volume management area of the session 2 is read out except for these data to supplement (add) directory management information and file management information of file 4 and file 5 to the volume management area thus read out to write once it into the session 3 as a new volume management area.

By updating volume management area every time new session is formed to newly record information in this way thus to carry out management of file on the basis of volume management area of the latest session, it is possible to read out files of all sessions.

It is to be noted since volume management area is recorded every time a new session is formed in the case of this embodiment, capacity required for inherent information of the disc is reduced. Accordingly, in the case of this embodiment, it is preferable that files as many as possible are collectively recorded as a single session.

As stated above, also in the case where copy of volume management area is made, since this volume management area is formed in a single collective (concentrated) area, it is possible to rapidly complete processing of copying as compared to the case where directory management information are recorded in a distributed manner.

Moreover, since location information such as Index to DRB, Index to ER shown in FIG. 8, or Index to ERB shown in FIG. 15, etc. is represented by relative location within the volume management area (No. of management block), such location information can be used as they are also in the area formed by newly copying that location information. In addition, when relative location within the volume management area is used as stated above, the number of bits required for indicating that relative position is reduced to more degree as compared to the case where information as described above is represented by absolute location including extent area. Thus, utilization efficiency of the disc can be improved accordingly.

While this invention has been described by taking the example where information is recorded or reproduced with respect to the magneto-optical disc, this invention can be applied, in addition to the above, not only to high speed accessible information recording media such as magnetic disc, etc., but also to an optical disc or other relatively low speed accessible information recording media.

Industrial Applicability

As described above, in accordance with this invention, the following effects/advantages can be provided.

In accordance with the information management method described in claim 1 and the data recording method described in claim 15, sub directory information is recorded in the second area in a manner to include information indicating location in the second area. Accordingly, the number of physical read/write operations for updating of directory is reduced, thus making it possible to retrieve, with ease and at a high speed, a predetermined directory file in the hierarchical directory. In addition, directory information can be updated in a short time.

Moreover, since relative recording location (position) in the second area of sub directory is described in the directory management information, also in the case where the directory management information is recorded into other areas, it becomes possible to use that recording position as it is. In addition, since that recording location (position) is represented by information indicating relative location in the second area of sub directory, data quantity required for representing that location can be reduced to more degree as compared to the case where that recording location (position) is represented by absolute location including the first area. As a result, capacity of data to be primarily recorded and reproduced can be increased accordingly. Thus, utilization efficiency of the recording medium can be improved.

In accordance with the data recording medium described in claim 8, sub directory information is recorded in the second area. In addition, sub directory information includes information indicating location in the second area. Accordingly, it becomes possible to realize data recording media which can be retrieved with ease and at high speed.

In accordance with the information retrieving method described in claim 22 and the information retrieving apparatus described in claim 26, root directory is accessed from location information of the second area. Thus, file is accessed on the basis of file location information within the root directory.

In accordance with the information retrieving method described in claim 23 and the information retrieving apparatus described in claim 27, root directory is accessed from first location information of the second area, and sub directory is accessed on the basis of second location information in the root directory and the parent directory. In addition, file is accessed on the basis of file location information in the sub directory.

In accordance with the information retrieving method described in claim 24 and the information retrieving apparatus described in claim 28, root directory is accessed from first location information of the second area, and sub directory is accessed on the basis of second location information in the root directory and the parent directory. In addition, file extent information is accessed on the basis of third location information in the sub directory and file is accessed on the basis of file extent information.

Accordingly, in either case, simple and quick access can be made.

In accordance with the information management method, when the recordable area is initialized, directory management information recorded in the rewrite disable area is copied to the recordable area, and management of information is carried out on the basis of the directory management information of the recordable area at times subsequent thereto. Accordingly, it is possible to unitarily carry out management of information of the recordable area and the rewrite disable area.

In accordance with the information management method, when data is recorded into the second area, new directory management information including directory management information recorded in the first area is recorded. At times subsequent thereto, management of information is carried out on the basis of the new directory management information. Accordingly, it is possible to unitarily carry out management of old information and information written once.

What is claimed is:

1. An information management method for managing information recorded on a recording medium, comprising the steps of:

managing a first area on the recording medium where data of file are recorded, wherein management of the first area is carried out in first allocation units by using first management information;

managing a second area on the recording medium, which is distinguished from the first area, wherein management of the second area is carried out in second allocation units each independent of the first allocation units by using second management information; and wherein sub directory information in a directory constituted with at least one of the second allocation units within the second area information includes information indicating location in the second area of the second allocation unit constituting that directory.

2. An information management method as set forth in claim 1, wherein the second allocation units are smaller than the first allocation units.

3. An information management method as set forth in claim 1, wherein in the case where one file consists of the plural first allocation units existing at discrete or separate locations, data recorded in the second area includes file extent information indicating a corresponding one or ones constituting the one file, of the first allocation units of the first area.

4. An information management method as set forth in claim 3, wherein file information corresponding to the one file in the directory includes information indicating location of the second allocation unit including the file extent information in the second area.

5. An information management method as set forth in claim 1, wherein in the case where one file consists of the successive first allocation units, file information corresponding to the one file in the directory includes file location information indicating a corresponding one or ones constituting the one file, of the first allocation units of the first area.

6. An information management method as set forth in claim 1, wherein in the case where one directory consists of the plural second allocation units, the second management information includes link information indicating information in which the plural second allocation units are connected to each other.

7. An information management method as set forth in claim 1, wherein data recorded in the second area includes information indicating location of a root directory in the second area.

8. A data recording medium on which data having hierarchical structure are recorded, comprising:
   a first area where data of a file are recorded in first allocation units;
   a second area distinguished from the first area with second allocation units, with a plurality of directories recorded therein, each independent of the first allocation unit; and
   wherein sub directory information in each directory includes information indicating location in the second area of the second allocation unit constituting that sub directory.

9. A data recording medium as set forth in claim 8, wherein the second allocation units are smaller than the first allocation units.

10. A data recording medium as set forth in claim 8, wherein in the case where one file consists of the plural first allocation units existing at discrete or separate locations, data recorded in the second area includes file extent information indicating a corresponding one or ones, of the first allocation units of the first area.

11. A data recording medium as set forth in claim 10, wherein file information corresponding to the one file in the directory includes information indicating location of the second allocation unit including the file extent information in the second area.

12. A data recording medium as set forth in claim 8, wherein in the case where one file consists of the successive first allocation units, file information corresponding to the one file in the directory includes file location information indicating a corresponding one or ones constituting the one file, of the first allocation units of the first area.

13. A data recording medium as set forth in claim 8, wherein in the case where one directory consists of the plural second allocation units, management information within data recorded in the second area includes link information indicating information in which the plural second allocation units are connected to each other.

14. A data recording medium as set forth in claim 8, wherein data recorded in the second area includes information indicating location of a root directory in the second area.

15. A data recording method for recording data having hierarchical directory structure onto a recording medium, comprising the steps of:
   recording data of file in first allocation units in a first area;
   recording a plurality of directories in second allocation units, each independent of the first allocation units, in a second area distinguished from the first area; and
   wherein sub directory information in each directory includes information indicating location in the second area of the second allocation unit constituting that sub directory.

16. A data recording method as set forth in claim 15, wherein the second allocation units are smaller than the first allocation units.

17. A data recording method as set forth in claim 15, wherein in the case where one file consists of the plural first allocation units existing at discrete or separate locations, data recorded in the second area includes file extent information indicating a corresponding one or ones constituting the one file, of the first allocation units of the first area.

18. A data recording method as set forth in claim 17, wherein file information corresponding to the one file in the directory includes information indicating location of the second allocation unit including the file extent information in the second area.

19. A data recording method as set forth in claim 15, wherein in the case where one file consists of the successive first allocation units, file information corresponding to the one file in the directory includes file location information indicating a corresponding one or ones constituting the one file, of the first allocation units of the first area.

20. A data recording method as set forth in claim 15, wherein in the case where one directory consists of the plural second allocation units, management information within data recorded in the second area includes link information indicating information in which the plural second allocation units are connected to each other.

21. A data recording method as set forth in claim 15, wherein data recorded in the second area includes information indicating location of a root directory in the second area.

22. An information retrieving method for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory constituted with at least one of the second allocation units within the second area is caused to include information directly indicating location in the second area of the second allocation unit constituting that sub directory,
   comprising the steps of:
      providing an access to a root directory on the basis of a predetermined location information within data recorded in the second area; and
      providing an access to the desired file on the recording medium on the basis of file location information indicating a corresponding one or ones of the of the first allocation units of the first area, constituting the desired file in file information corresponding to the desired file in the root directory.

23. An information retrieving method for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory consisting of at least one of the second allocation units within the second area is caused to include information directly indicating location in the second area of the second allocation unit constituting that sub directory, comprising the steps of:

providing an access to a root directory on the basis of first location information within data recorded in the second area;

providing an access to the sub directory including file information corresponding to the desired file on the basis of second location information in the root directory and parent directory; and providing an access to the desired file on the recording medium on the basis of file location information indicating a corresponding one or ones of the first allocation units of the first area, constituting the desired file of file information corresponding to the desired file in the sub directory.

24. An information retrieving method for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory consisting of at least one of the second allocation units within the second area is caused to include information directly indicating location in the second area of the second allocation unit constituting that sub directory, comprising the steps of:

providing an access to a root directory on the basis of first location information within data recorded in the second area;

providing an access to the sub directory including file information corresponding to the desired file on the basis of second location information in the root directory and parent directory;

providing an access to file extent information indicating a corresponding one or ones of the first allocation units of the first area, constituting the desired file on the basis of third location information in file information corresponding to the desired file in the sub directory; and providing an access to the desired file on the recording medium on the basis of the file extent information.

25. An information retrieving method as set forth in claim 22, 23 or 24, further comprising the steps of:

reading out, from the recording medium, data recorded in the second area;

storing, into a memory, the data recorded in the second memory which has been read out; and carrying out an access to the root directory, an access to the sub directory, and/or an access to the file extent information by using the data stored in the memory.

26. An information retrieving apparatus adapted for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory consisting of at least one of the second allocation units within the second area is caused to include information directly indicating location in the second area of the second allocation unit constituting that sub directory, comprising:

means for providing an access to a root directory on the basis of a predetermined location information within data recorded in the second area; and means for providing an access to the desired file on the recording medium on the basis of file location information indicating a corresponding one or ones of the first area, constituting the desired file of file information corresponding to the desired file in the root directory.

27. An information retrieving apparatus adapted for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory consisting of at least one of the second allocation units within the second area is caused to include information directly indicating location in the second area of the second allocation unit constituting that sub directory, comprising:

means for providing an access to a root directory on the basis of first location information within data recorded in the second area;

means for providing an access to the sub directory including file information corresponding to the desired file on the basis of second location information in the root directory and parent directory; and means for providing an access to the desired file on the recording medium on the basis of file location information indicating a corresponding one or ones of the first allocation units of the first area, constituting the desired file in file information corresponding to the desired file in the sub directory.

28. An information retrieving apparatus adapted for retrieving a desired file from a recording medium in which management of a first area on the recording medium where data of file are recorded is carried out in first allocation units by using first management information, management of a second area on the recording medium distinguished from the first area is carried out in second allocation units each independent of the first allocation unit by using second management information, and sub directory information in a directory consisting of at least one of the second allocation units within the second area is caused to include information directly indicating location in the second area of the second allocation unit constituting that sub directory, comprising:

means for providing an access to a root directory on the basis of first location information within data recorded in the second area;

means for providing an access to the sub directory including file information corresponding to the desired file on the basis of second location information in the root directory and parent directory;

means for providing an access to file extent information indicating a corresponding one or more of the first allocation units of the first area, constituting the desired file on the basis of third location information in the file information corresponding to the desired file in the sub directory; and means for providing an access to the desired file on the recording medium on the basis of the file extent information.

29. An information retrieving apparatus as set forth in claim 26, 27 or 28, wherein the apparatus further includes:

means for reading out, from the recording medium, data recorded in the second area;

and a memory for storing the data recorded in the second area which has been read out, thus to carry out an access to the root directory, an access to the sub directory and/or an access to the file extent information by using the data stored in the memory.

30. An information management method for a write once type information recording disc, wherein the method comprises the steps of:

recording, into a first area of said disc, predetermined data and directory management information for carrying out management of the data;

recording, into a second area of said disc, new directory management information including the directory management information recorded in the first area of said disc when new data is recorded into the second area of said disc; and carrying out, at times subsequent thereto, management of data on the basis of the directory management information of the second area.

* * * * *